(12) United States Patent
Okano et al.

(10) Patent No.: US 11,912,360 B2
(45) Date of Patent: Feb. 27, 2024

(54) VEHICLE CONTROL METHOD, VEHICLE CONTROL SYSTEM, AND VEHICLE

(71) Applicant: TOYOTA JIDOSHA KABUSHIKI KAISHA, Toyota (JP)

(72) Inventors: Hideki Okano, Toyota (JP); Hisashi Somada, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 17/674,740

(22) Filed: Feb. 17, 2022

(65) Prior Publication Data

US 2022/0266903 A1 Aug. 25, 2022

(30) Foreign Application Priority Data

Feb. 24, 2021 (JP) ................................. 2021-027852

(51) Int. Cl.
 *B62D 7/15* (2006.01)
 *B62D 6/00* (2006.01)
 *B62D 6/02* (2006.01)

(52) U.S. Cl.
 CPC ............ *B62D 7/159* (2013.01); *B62D 6/002* (2013.01); *B62D 6/02* (2013.01); *B62D 7/1545* (2013.01)

(58) Field of Classification Search
 CPC .......... B62D 7/159; B62D 6/002; B62D 6/02; B62D 7/1509
 See application file for complete search history.

(56) References Cited

U.S. PATENT DOCUMENTS

| | | | |
|---|---|---|---|
| 4,295,657 A | 10/1981 | Sano et al. | |
| 4,705,131 A * | 11/1987 | Shibahata | B62D 7/1572 180/415 |
| 4,767,129 A | 8/1988 | Kawamoto et al. | |
| 4,943,758 A * | 7/1990 | Tsurumiya | B62D 7/1581 318/504 |
| 5,365,440 A * | 11/1994 | Abe | B62D 7/159 180/408 |
| 5,627,754 A * | 5/1997 | Asanuma | B62D 7/159 180/408 |

(Continued)

FOREIGN PATENT DOCUMENTS

| | | |
|---|---|---|
| CN | 111267610 A | 6/2020 |
| DE | 43 34 279 A1 | 4/1995 |

(Continued)

*Primary Examiner* — Khoi H Tran
*Assistant Examiner* — Tristan J Greiner
(74) *Attorney, Agent, or Firm* — Sughrue Mion, PLLC

(57) ABSTRACT

A vehicle control method for controlling a vehicle including executing a front wheel and a rear wheel including: front wheel-only steering operation control for turning the front wheel without turning the rear wheel in response to a steering instruction from a driving entity; executing rear wheel-only steering operation control for turning the rear wheel without turning the front wheel in response to the steering instruction from the driving entity; and executing a specified control execution process for executing one type of steering operation control specified by the driving entity among a plurality of types of steering operation control including at least the front wheel-only steering operation control and the rear wheel-only steering operation control.

12 Claims, 18 Drawing Sheets

(56) References Cited

U.S. PATENT DOCUMENTS

| | | | | |
|---|---|---|---|---|
| 2013/0131927 A1* | 5/2013 | Ishihara | ................. | B62D 6/00 |
| | | | | 701/43 |
| 2017/0158227 A1* | 6/2017 | Katzourakis | ........... | B62D 6/008 |
| 2019/0031234 A1 | 1/2019 | Schall | | |

FOREIGN PATENT DOCUMENTS

| | | | | |
|---|---|---|---|---|
| DE | 4334279 A1 * | 4/1995 | ............ | B62D 7/148 |
| GB | 2574393 A | 12/2019 | | |
| JP | 55-091458 A | 7/1980 | | |
| JP | 4-118383 A | 4/1992 | | |
| JP | 4-300782 A | 10/1992 | | |
| JP | 2020-189609 A | 11/2020 | | |

* cited by examiner

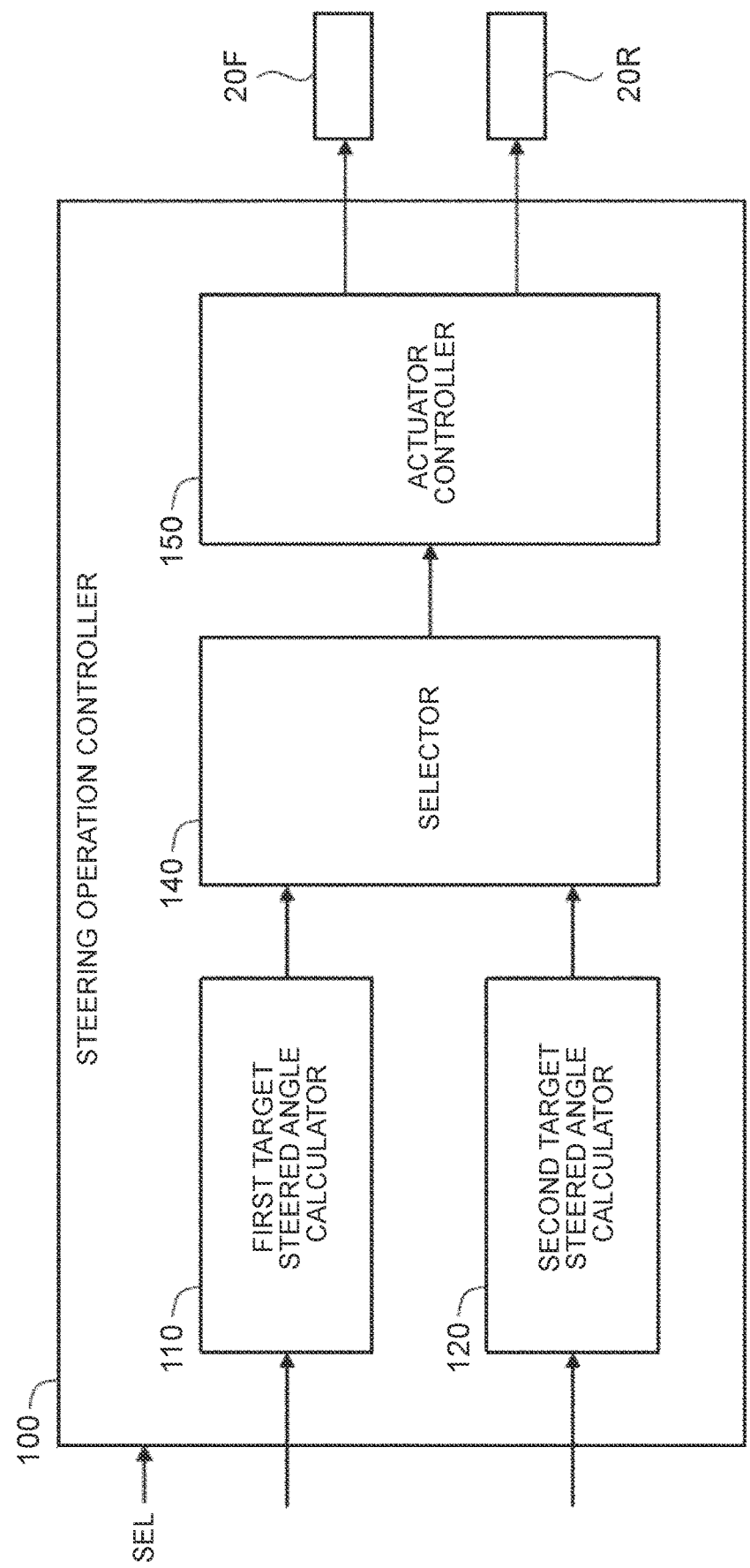

VEHICLE CONTROL METHOD, VEHICLE CONTROL SYSTEM, AND VEHICLE

CROSS-REFERENCE TO RELATED APPLICATION

This application claims priority to Japanese Patent Application No. 2021-027852 filed on Feb. 24, 2021, incorporated herein by reference in its entirety.

BACKGROUND

1. Technical Field

The present disclosure relates to a vehicle control method for controlling a vehicle including front wheels and rear wheels, a vehicle control system, and vehicle. In particular, the present disclosure relates to steering operation control in a vehicle including front wheels and rear wheels.

2. Description of Related Art

Japanese Unexamined Patent Application Publication No. 55-91458 (JP 55-91458 A) discloses a vehicle configured to perform 4-wheel steering (4WS).

SUMMARY

In the technology disclosed in JP 55-91458 A, a steering wheel is mechanically coupled to front wheels. Therefore, rear wheels cannot be turned without turning the front wheels.

The present disclosure provides a vehicle control method, a vehicle control system, and vehicle that achieves a more flexible steering operation in a vehicle including front wheels and rear wheels.

In the first aspect of the present disclosure, a vehicle control method for controlling a vehicle including executing a front wheel and a rear wheel includes front wheel-only steering operation control for turning the front wheel without turning the rear wheel in response to a steering instruction from a driving entity, executing rear wheel-only steering operation control for turning the rear wheel without turning the front wheel in response to the steering instruction from the driving entity, and executing a specified control execution process for executing one type of steering operation control specified by the driving entity among a plurality of types of steering operation control including at least the front wheel-only steering operation control and the rear wheel-only steering operation control.

The vehicle control method according to the first aspect of the present disclosure, may further include prohibiting the rear wheel-only steering operation control when a vehicle speed of the vehicle is equal to or higher than a threshold.

In the vehicle according to the first aspect of the present disclosure, a target steered angle of the rear wheel may depend on a vehicle speed of the vehicle. A first vehicle speed range may be a range in which the vehicle speed is lower than a threshold. A second vehicle speed range may be a range in which the vehicle speed is equal to or higher than the threshold. The specified control execution process may include setting the target steered angle, when the driving entity specifies the rear wheel-only steering operation control, such that the target steered angle decreases along with an increase in the vehicle speed in the first vehicle speed range and reaches zero in the second vehicle speed range.

The vehicle control method according to the first aspect of the present disclosure, may further include executing front-and-rear wheels steering operation control for turning both the front wheel and the rear wheel in response to the steering instruction. The plurality of types of steering operation control may further include the front-and-rear wheels steering operation control in addition to the front wheel-only steering operation control and the rear wheel-only steering operation control.

In the vehicle according to the first aspect of the present disclosure, the specified control execution process may include executing, when the driving entity specifies a ratio between a steered angle of the front wheel and a steered angle of the rear wheel, the front-and-rear wheels steering operation control based on the ratio specified by the driving entity.

In the vehicle according to the first aspect of the present disclosure, the specified control execution process may include executing, when the driving entity specifies whether a phase relationship between the front wheel and the rear wheel is in-phase or reverse phase, the front-and-rear wheels steering operation control based on the phase relationship specified by the driving entity.

In the vehicle according to the first aspect of the present disclosure, a target steered angle of the front wheel and a target steered angle of the rear wheel may depend on a vehicle speed of the vehicle. A first vehicle speed range may be a range in which the vehicle speed may be lower than a threshold. A second vehicle speed range may be a range in which the vehicle speed is equal to or higher than the threshold. The specified control execution process may include setting the target steered angles, when the driving entity specifies in-phase as a phase relationship between the front wheel and the rear wheel, such that the target steered angles decrease along with an increase in the vehicle speed over the first vehicle speed range and the second vehicle speed range. The specified control execution process may include setting the target steered angles, when the driving entity specifies reverse phase as the phase relationship between the front wheel and the rear wheel, such that the target steered angles decrease along with the increase in the vehicle speed in the first vehicle speed range and reach zero in the second vehicle speed range.

In the vehicle according to the first aspect of the present disclosure, the specified control execution process may include a process for acquiring control specifying information indicating specification by the driving entity, and a process for executing the specified control execution process based on the control specifying information.

In the vehicle according to the first aspect of the present disclosure, the driving entity may be a driver of the vehicle. The steering instruction may be a steering operation performed on a steering wheel by the driver. The process for acquiring the control specifying information may include a process for receiving the control specifying information input by the driver via a user interface.

In the vehicle according to the first aspect of the present disclosure, the driving entity may be an autonomous driving system configured to control autonomous driving of the vehicle based on driving environment information indicating a driving environment of the vehicle. The steering instruction may be a steering request from the autonomous driving system. The process for acquiring the control specifying information may include a process for determining the control specifying information based on the driving environment information.

In the second aspect of the present disclosure, a vehicle control system configured to control a vehicle including a front wheel and a rear wheel includes one or more processors. The processors is configured to execute front wheel-only steering operation control for turning the front wheel without turning the rear wheel in response to a steering instruction from a driving entity, rear wheel-only steering operation control for turning the rear wheel without turning the front wheel in response to the steering instruction from the driving entity, and a specified control execution process for executing one type of control specified by the driving entity among a plurality of types of control including at least the front wheel-only steering operation control and the rear wheel-only steering operation control.

The vehicle control system according to the second aspect of the present disclosure, may further include a user interface to be operated by a driver of the vehicle. The driving entity may be the driver. The steering instruction may be a steering operation performed on a steering wheel by the driver. The one or more processors may be configured to acquire, via the user interface, control specifying information indicating specification by the driver, and execute the specified control execution process based on the control specifying information.

In the third aspect of the present disclosure, a vehicle includes a front wheel turning actuator mechanically separated from a steering wheel and configured to turn a front wheel, a rear wheel turning actuator mechanically separated from the steering wheel and configured to turn a rear wheel, and one or more processors. The processor is configured to turn the front wheel by controlling the front wheel turning actuator, turn the rear wheel by controlling the rear wheel turning actuator, execute front wheel-only steering operation control for turning the front wheel without turning the rear wheel in response to a steering instruction from a driving entity, execute rear wheel-only steering operation control for turning the rear wheel without turning the front wheel in response to the steering instruction from the driving entity, and execute a specified control execution process for executing one type of control specified by the driving entity among a plurality of types of control including at least the front wheel-only steering operation control and the rear wheel-only steering operation control.

According to the present disclosure, the plurality of types of steering operation control including at least the front wheel-only steering operation control and the rear wheel-only steering operation control is available in the vehicle including the front wheel and the rear wheel. Among the plurality of types of steering operation control, steering operation control specified by the driving entity of the vehicle is executed. That is, the driving entity can selectively use the plurality of types of steering operation control with flexibility depending on situations. Thus, a flexible steering operation can be executed depending on situations.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 18 is a block diagram illustrating a functional configuration related to steering operation control according to a third embodiment.

DETAILED DESCRIPTION OF EMBODIMENTS

Embodiments of the present disclosure are described with reference to the accompanying drawings.

1. Overview

Figure 1:
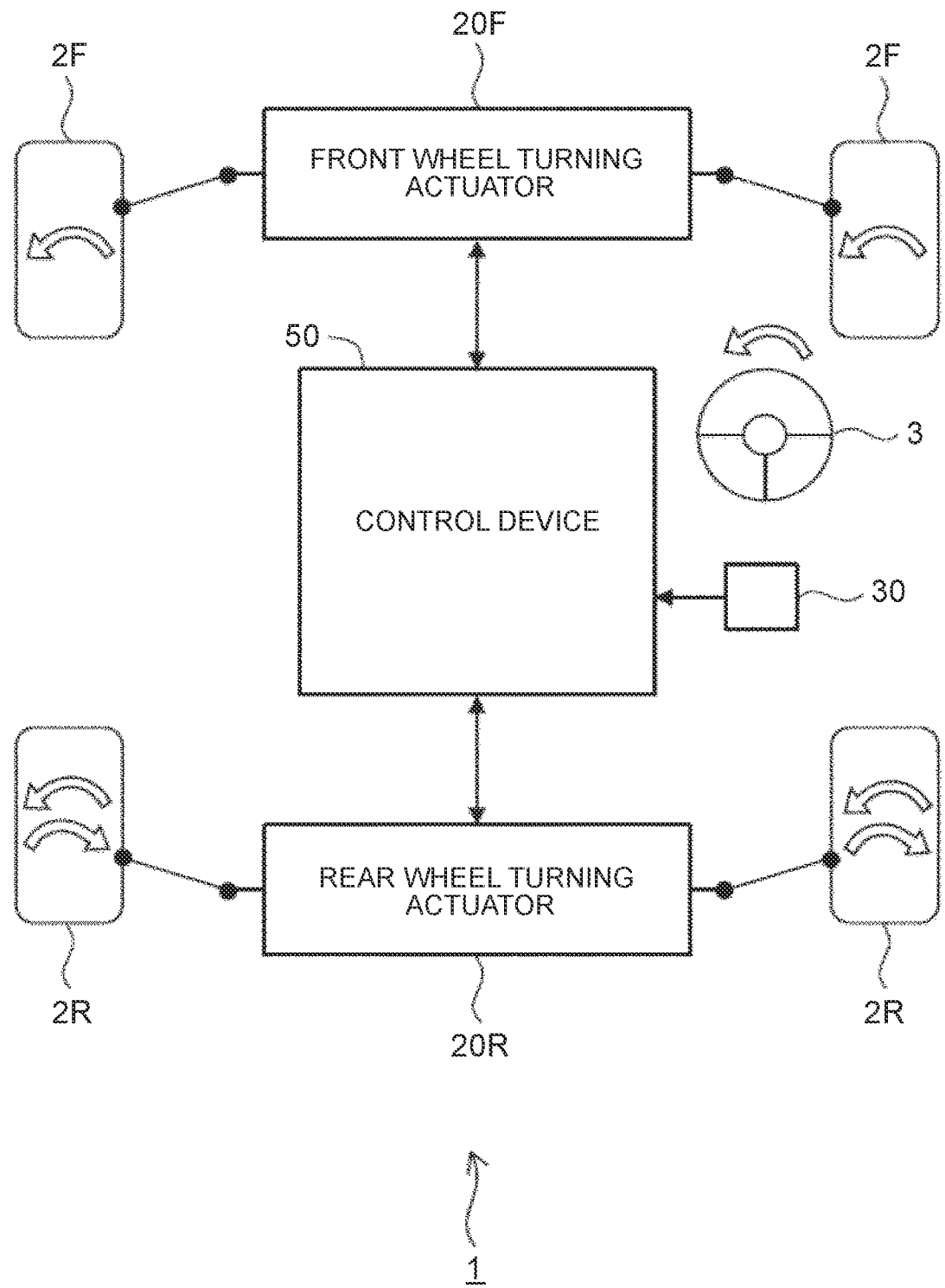
FIG. 1 is a conceptual diagram schematically illustrating the configuration of a vehicle according to embodiments of the present disclosure.

FIG. 1 is a conceptual diagram schematically illustrating the configuration of a vehicle 1 according to the embodiments. The vehicle 1 includes wheels 2 and a steering wheel 3. The wheels 2 include front wheels 2F and rear wheels 2R.

In the following description, terms "steering operation" and "turn" mean a change of directions of the wheels 2, that is, steered angles of the wheels 2. According to the embodiments, the steering operation can be performed not only on the front wheels 2F but also on the rear wheels 2R. Further, the steering operation can be performed independently on the front wheels 2F or the rear wheels 2R. Therefore, the front wheels 2F can be turned without turning the rear wheels 2R, and the rear wheels 2R can be turned without turning the front wheels 2F. The steering operation may be performed simultaneously on the front wheels 2F and the rear wheels 2R.

More specifically, the vehicle 1 according to the embodiments is a steer-by-wire vehicle. As illustrated in FIG. 1, the vehicle 1 includes a front wheel turning actuator 20F and a rear wheel turning actuator 20R.

The front wheel turning actuator 20F is an electric actuator configured to turn the front wheels 2F. Examples of the front wheel turning actuator 20F include an electric motor. The front wheels 2F and the front wheel turning actuator 20F are mechanically separated from the steering wheel 3. Operations of the front wheel turning actuator 20F are controlled by a control device 50 to turn the front wheels 2F.

The rear wheel turning actuator 20R is an electric actuator configured to turn the rear wheels 2R. Examples of the rear wheel turning actuator 20R include an electric motor. The rear wheels 2R and the rear wheel turning actuator 20R are mechanically separated from the steering wheel 3. Operations of the rear wheel turning actuator 20R are controlled by the control device 50 to turn the rear wheels 2R.

A sensor unit 30 is mounted on the vehicle 1. The sensor unit 30 includes a steering angle sensor, steered angle sensors, and a vehicle speed sensor. The steering angle sensor detects a steering angle of the steering wheel 3. The steered angle sensors detect steered angles of the wheels 2. The vehicle speed sensor detects a vehicle speed of the vehicle 1. The sensor unit 30 may include a recognition sensor configured to recognize situations around the vehicle 1.

The control device 50 controls the vehicle 1. The control device 50 is typically mounted on the vehicle 1. The embodiments are not limited to this structure. For example, a part of the control device 50 may be included in a remote driving system outside the vehicle 1 to remotely control the vehicle 1.

Description is given particularly about "steering operation control" for controlling the steering operation on the wheels 2. The control device 50 executes the steering operation control in the steer-by-wire system in response to a steering instruction from a "driving entity" of the vehicle 1.

Examples of the driving entity of the vehicle 1 include a driver (human). The driver may be a driver actually riding the vehicle 1 or a remote operator remotely driving the vehicle 1. When the driving entity is the driver, the steering instruction corresponds to a driver's steering operation on the steering wheel 3. The driver's steering operation on the steering wheel 3 is detected by the steering angle sensor in the sensor unit 30. The control device 50 executes the steering operation control in response to the driver's steering operation on the steering wheel 3 based on a detection result from the sensor unit 30.

As another example, the driving entity of the vehicle 1 may be an autonomous driving system configured to control autonomous driving of the vehicle 1. When the driving entity is the autonomous driving system, the steering instruction corresponds to a steering request from the autonomous driving system. The autonomous driving system controls the autonomous driving of the vehicle 1 and issues the steering request as necessary based on a detection result from the sensor unit 30. The control device 50 executes the steering operation control in response to the steering request from the autonomous driving system based on the detection result from the sensor unit 30.

Figure 2:
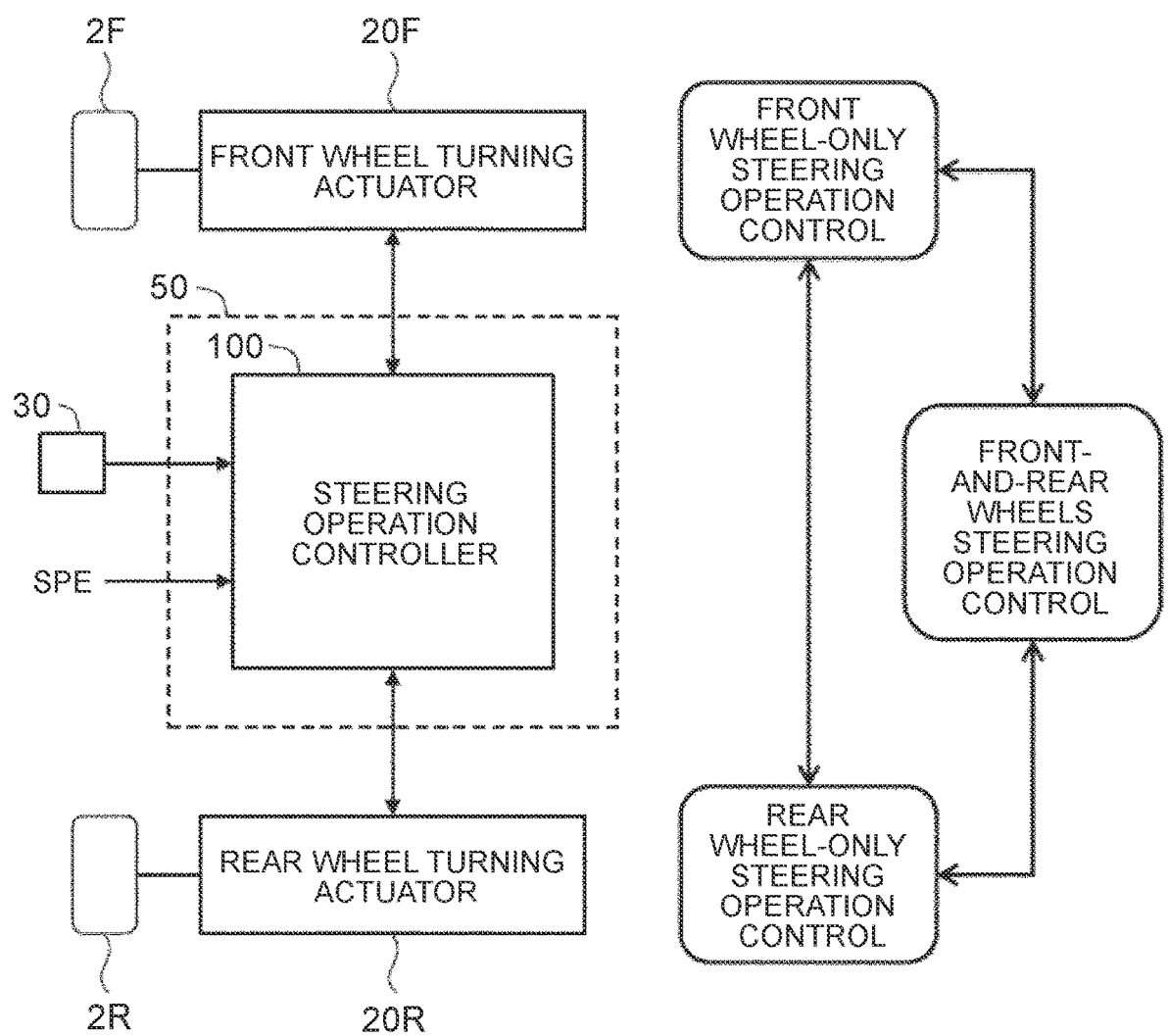
FIG. 2 is a conceptual diagram for describing steering operation control according to the embodiments of the present disclosure.

FIG. 2 is a conceptual diagram for describing the steering operation control according to the embodiments. The control device 50 includes a steering operation controller 100 configured to execute the steering operation control. The steering operation controller 100 turns the front wheels 2F by controlling the front wheel turning actuator 20F. The steering operation controller 100 turns the rear wheels 2R by controlling the rear wheel turning actuator 20R. The steering operation controller 100 can independently control the front wheel turning actuator 20F or the rear wheel turning actuator 20R. Thus, the steering operation controller 100 can achieve a plurality of types of steering operation control (steering operation mode).

"Front wheel-only steering operation control" is steering operation control for turning the front wheels 2F without turning the rear wheels 2R. The steering operation controller 100 executes the front wheel-only steering operation control by controlling the front wheel turning actuator 20F.

"Rear wheel-only steering operation control" is steering operation control for turning the rear wheels 2R without turning the front wheels 2F. The steering operation controller 100 executes the rear wheel-only steering operation control by controlling the rear wheel turning actuator 20R.

"Front-and-rear wheels steering operation control" is steering operation control for turning both the front wheels 2F and the rear wheels 2R. The steering operation controller 100 executes the front-and-rear wheels steering operation control by controlling the front wheel turning actuator 20F and the rear wheel turning actuator 20R.

According to the embodiments, at least two types of steering operation control that are the front wheel-only steering operation control and the rear wheel-only steering operation control are available. The steering operation controller 100 executes at least the front wheel-only steering operation control and the rear wheel-only steering operation control by switching the front wheel-only steering operation control and the rear wheel-only steering operation control. In other words, the steering operation controller 100 selectively executes one of the plurality of types of steering operation control including the front wheel-only steering operation control and the rear wheel-only steering operation control.

As another example, three types of steering operation control that are the front wheel-only steering operation control, the rear wheel-only steering operation control, and the front-and-rear wheels steering operation control may be available. In this case, the steering operation controller 100 executes the front wheel-only steering operation control, the rear wheel-only steering operation control, and the front-and-rear wheels steering operation control by switching the front wheel-only steering operation control, the rear wheel-only steering operation control, and the front-and-rear wheels steering operation control. In other words, the steering operation controller 100 selectively executes one of the plurality of types of steering operation control including the front wheel-only steering operation control, the rear wheel-only steering operation control, and the front-and-rear wheels steering operation control.

According to the embodiments, one of the plurality of types of steering operation control to be executed can be specified by the "driving entity" described above. That is, the steering operation controller 100 selectively executes one of the plurality of types of steering operation control specified by the driving entity. This process is hereinafter referred to as "specified control execution process".

"Control specifying information SPE" indicates specification by the driving entity. The steering operation controller 100 acquires the control specifying information SPE from the driving entity, and executes the specified control execution process based on the control specifying information SPE. The control specifying information SPE may specify not only a desired type of steering operation control but also a detailed setting of the steering operation control.

Figure 3:
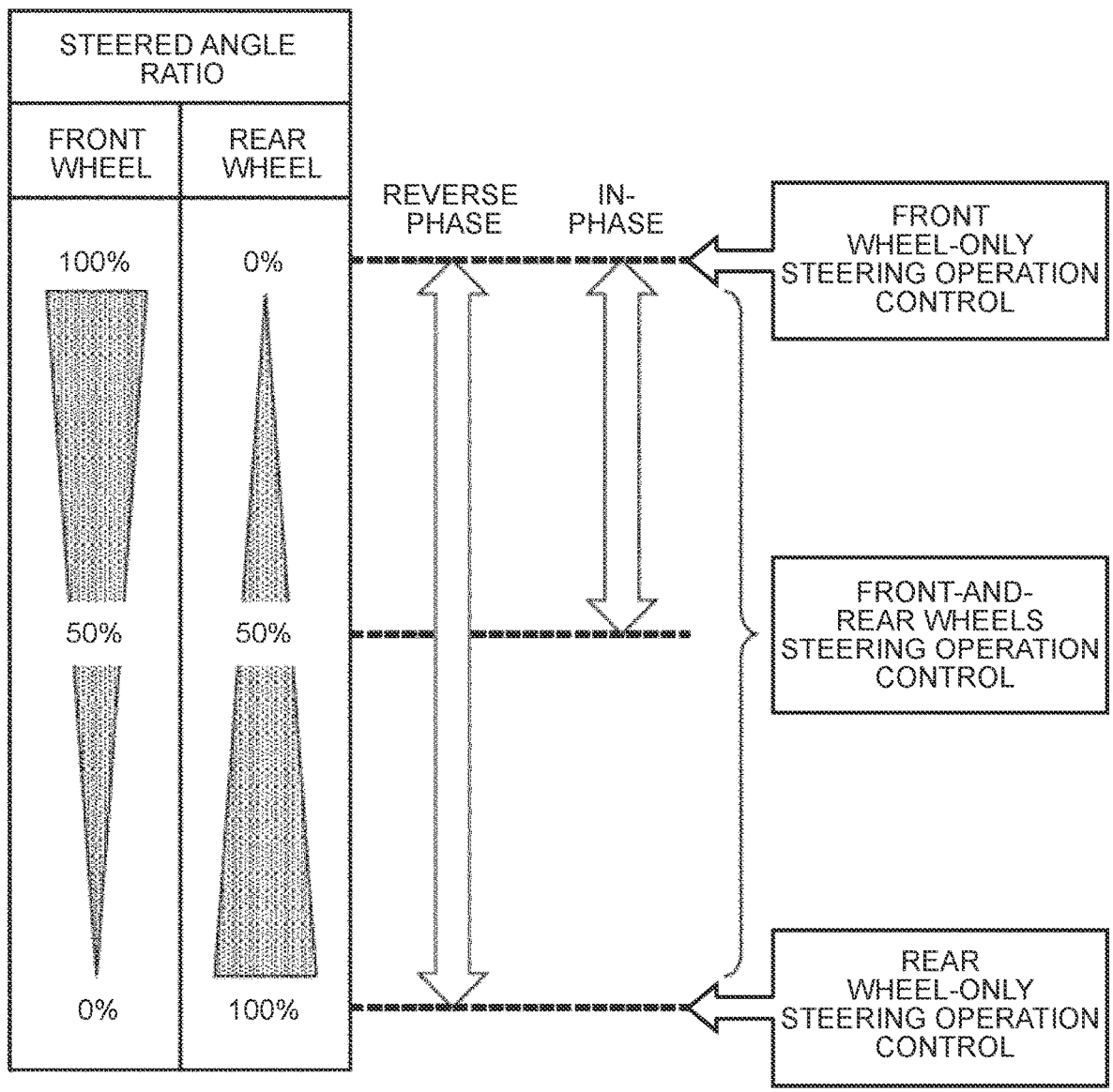
FIG. 3 is a conceptual diagram for describing an example of a setting of the steering operation control that is specified by a driving entity in the embodiments of the present disclosure.

FIG. 3 is a conceptual diagram for describing an example of the setting of the steering operation control that is specified by the driving entity.

For example, the driving entity may specify a ratio between a steered angle of the front wheels 2F (target steered angle) and a steered angle of the rear wheels 2R (target steered angle). The steered angle ratio may be changeable continuously or switchable stepwise. The control specifying information SPE indicates the steered angle ratio specified by the driving entity. The steering operation controller 100 executes the steering operation control in accordance with the steered angle ratio indicated by the control specifying information SPE.

When the steered angle ratio is "front wheels 2F:rear wheels 2R=100%: 0%", the control specifying information SPE specifies the "front wheel-only steering operation control". In this case, the steering operation controller 100 executes the front wheel-only steering operation control based on the steered angle ratio indicated by the control specifying information SPE. When the steered angle ratio is "front wheels 2F:rear wheels 2R=0%:100%", the control specifying information SPE specifies the "rear wheel-only steering operation control". In this case, the steering operation controller 100 executes the rear wheel-only steering operation control based on the steered angle ratio indicated by the control specifying information SPE. In the other cases, the steering operation controller 100 executes the front-and-rear wheels steering operation control based on the steered angle ratio indicated by the control specifying information SPE.

There is a possibility that the driving entity specifies the front-and-rear wheels steering operation control but does not particularly specify the steered angle ratio. In this case, the steering operation controller 100 may use a default steered angle ratio or automatically determine an appropriate steered angle ratio.

As another example, the driving entity may specify whether a phase relationship between the front wheels 2F and the rear wheels 2R is "in-phase" or "reverse phase". The term "in-phase" means that the turning direction of the front wheels 2F is identical to the turning direction of the rear wheels 2R. The term "reverse phase" means that the turning direction of the front wheels 2F is opposite to the turning direction of the rear wheels 2R. In the case of reverse phase, the turning direction of the vehicle 1 is identical to the turning direction of the front wheels 2F and opposite to the turning direction of the rear wheels 2R. In this meaning, the term "reverse phase" may indicate that the turning direction of the vehicle 1 is opposite to the turning direction of the rear wheels 2R.

As illustrated in FIG. 3, the steered angle ratio of the rear wheels 2R is set within a range of 0% to 50% in the case of "in-phase". This is because the vehicle 1 turns in a direction opposite to a desired turning direction when the steered angle ratio of the rear wheels 2R is larger than the steered angle ratio of the front wheels 2F. In the case of "reverse phase", the steered angle ratio of the rear wheels 2R can be set within a range of 0% to 100%. In the case of rear wheel-only steering operation control, the phase relationship is always reverse phase.

The control specifying information SPE indicates the phase relationship specified by the driving entity (in-phase or reverse phase). The steering operation controller 100 executes the steering operation control (in particular, the front-and-rear wheels steering operation control) based on the phase relationship indicated by the control specifying information SPE.

There is a possibility that the driving entity specifies the front-and-rear wheels steering operation control but does not particularly specify the phase relationship. In this case, the steering operation controller 100 may use a default phase relationship or automatically determine an appropriate phase relationship.

As described above, the vehicle 1 according to the embodiments can execute the plurality of types of steering operation control. The driving entity of the vehicle 1 can be configured to specify a desired one of the plurality of types of steering operation control. The plurality of types of steering operation control has different turning characteristics. The driving entity of the vehicle 1 can selectively use the plurality of types of steering operation control with flexibility depending on situations.

Figure 4:
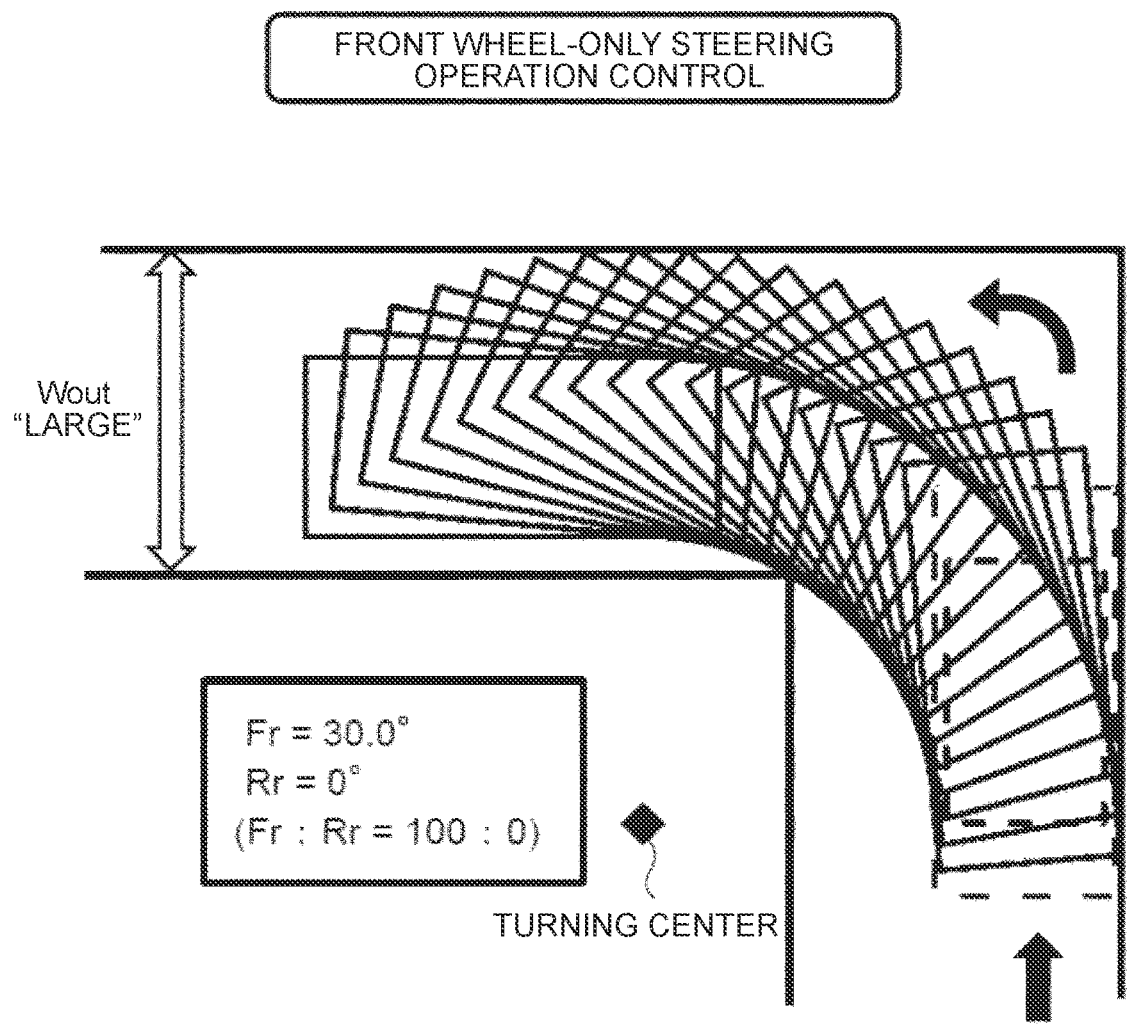
FIG. 4 is a conceptual diagram for describing a vehicle turning characteristic in a case of front wheel-only steering operation control according to the embodiments of the present disclosure.

FIG. 4 is a conceptual diagram for describing a vehicle turning characteristic in the case of front wheel-only steering operation control. In the case of front wheel-only steering operation control, a turning center is located posterior to the center of the vehicle 1, and a turning radius is relatively large. FIG. 4 also illustrates a post-turning trajectory width Wout necessary for turning. In the case of front wheel-only steering operation control, the post-turning trajectory width Wout is largest among the plurality of types of steering operation control.

Figure 5:
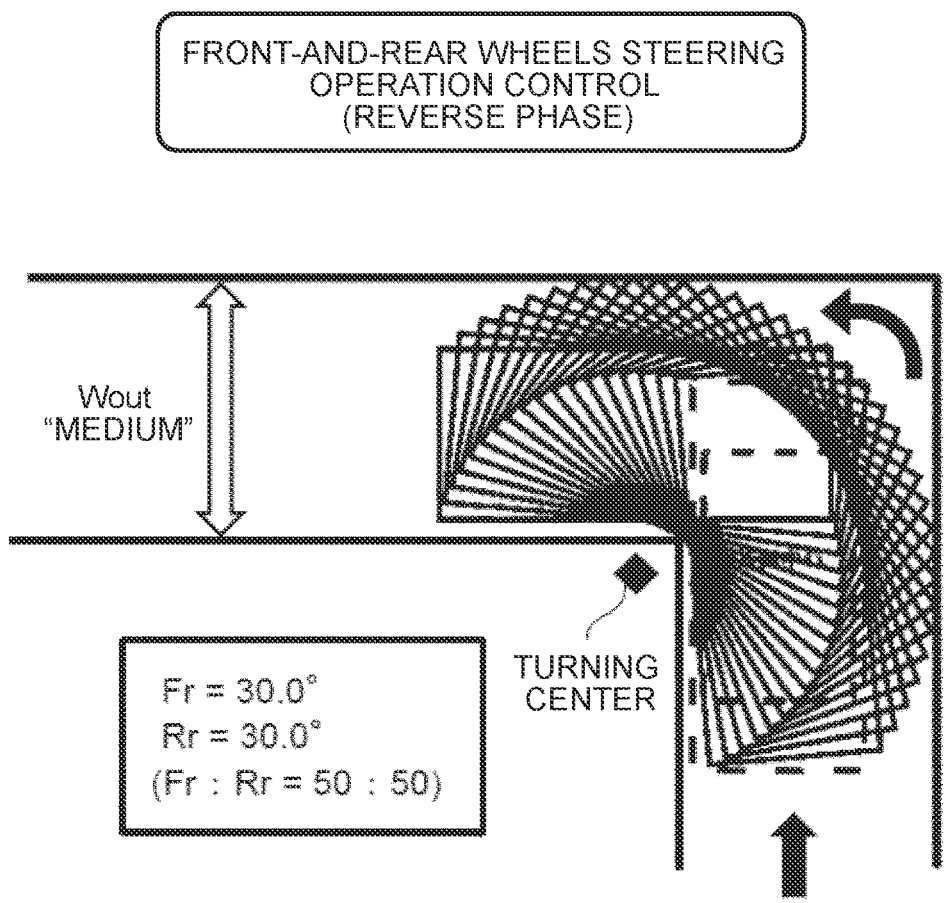
FIG. 5 is a conceptual diagram for describing a vehicle turning characteristic in a case of front-and-rear wheels steering operation control (reverse phase) according to the embodiments of the present disclosure.

FIG. 5 is a conceptual diagram for describing a vehicle turning characteristic in the case of reverse-phase front-and-rear wheels steering operation control. In the case of reverse-phase front-and-rear wheels steering operation control, the turning center is located near the center of the vehicle 1, and the turning radius is relatively small. The post-turning trajectory width Wout necessary for turning is smaller than that in the case of front wheel-only steering operation control illustrated in FIG. 4.

Figure 6:
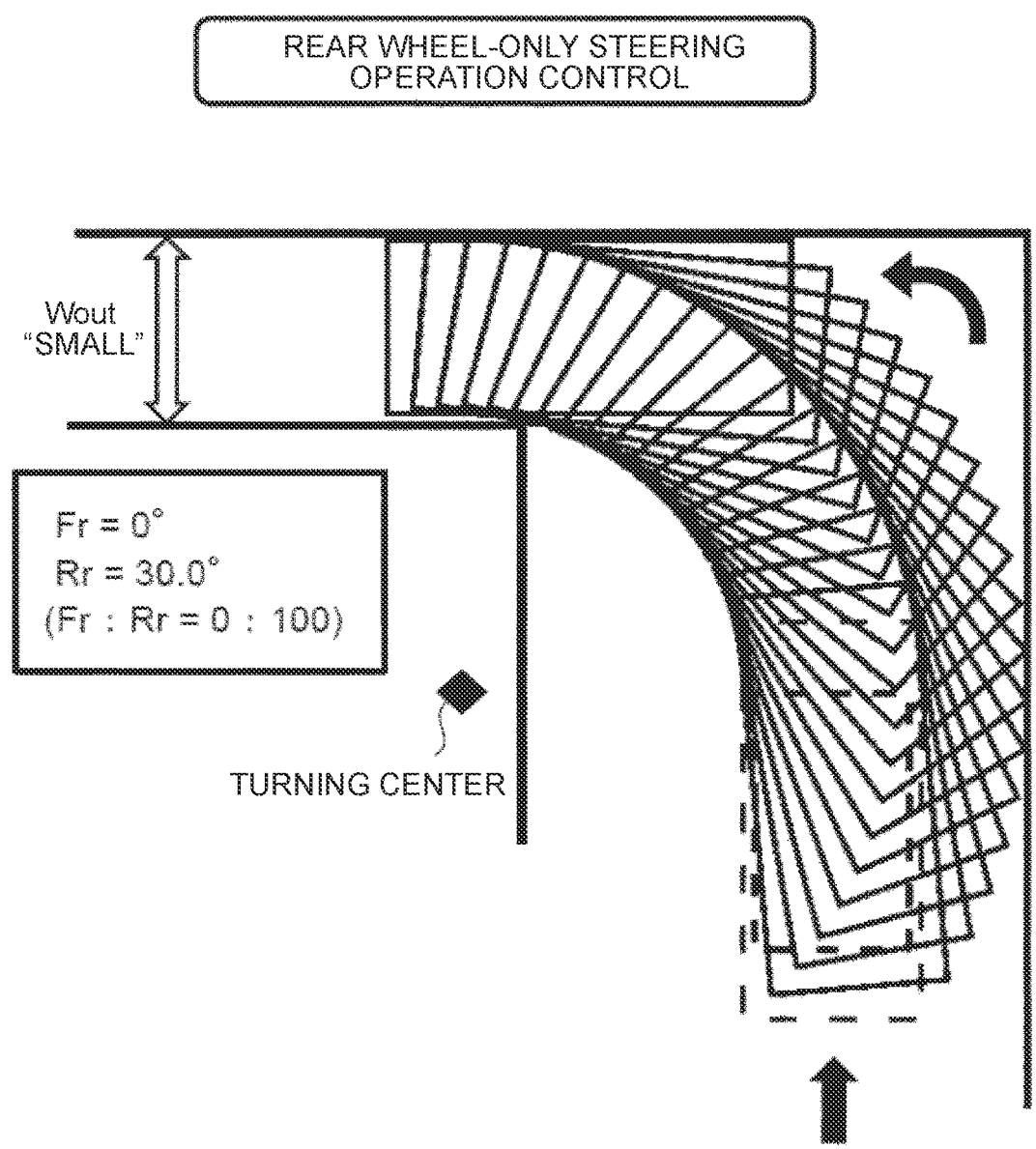
FIG. 6 is a conceptual diagram for describing a vehicle turning characteristic in a case of rear wheel-only steering operation control according to the embodiments of the present disclosure.

FIG. 6 is a conceptual diagram for describing a vehicle turning characteristic in the case of rear wheel-only steering operation control. In the case of rear wheel-only steering operation control, the turning center is located anterior to the center of the vehicle 1, and the turning radius is relatively large. In the case of rear wheel-only steering operation control, the post-turning trajectory width Wout is smallest among the plurality of types of steering operation control.

Figure 7:
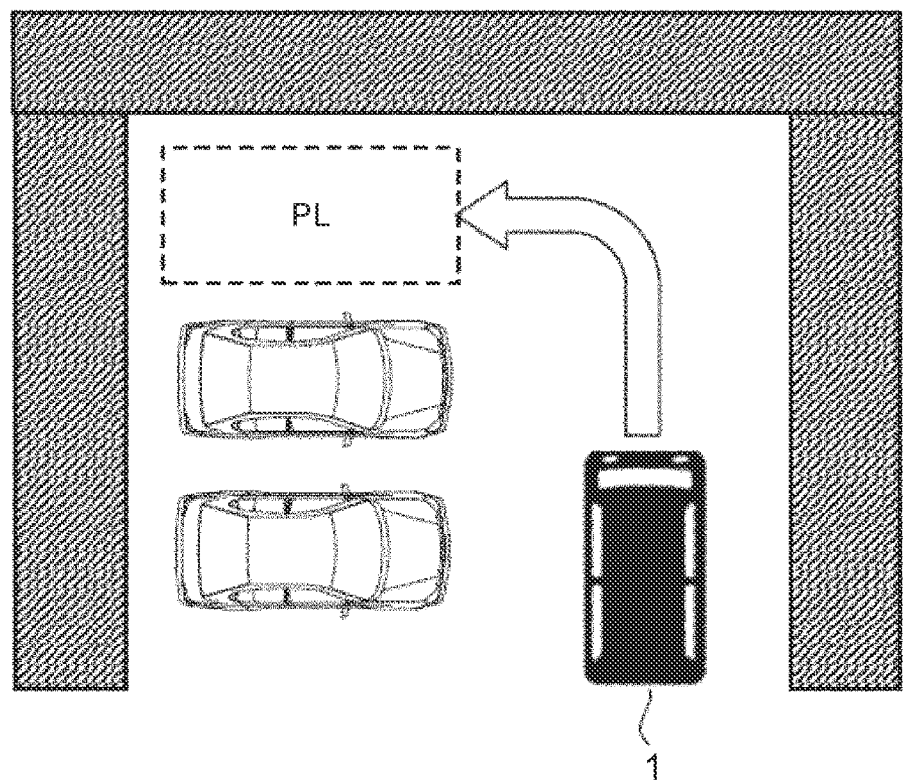
FIG. 7 is a conceptual diagram for describing an example of application of the rear wheel-only steering operation control according to the embodiments of the present disclosure.

FIG. 7 is a conceptual diagram for describing an example of application of the rear wheel-only steering operation control. In the example illustrated in FIG. 7, the vehicle 1 needs to be parked in a narrow parking space PL. If the front wheel-only steering operation control with the large post-turning trajectory width Wout is used, it is necessary to steer the vehicle 1 many times to avoid contact with surrounding obstacles. This problem is more salient as a wheelbase or overhang increases. In this situation, the rear wheel-only steering operation control (see FIG. 6) according to the embodiments is useful. By using the rear wheel-only steering operation control, the vehicle 1 can easily be parked in the narrow parking space PL without being steered many times.

Figure 8:
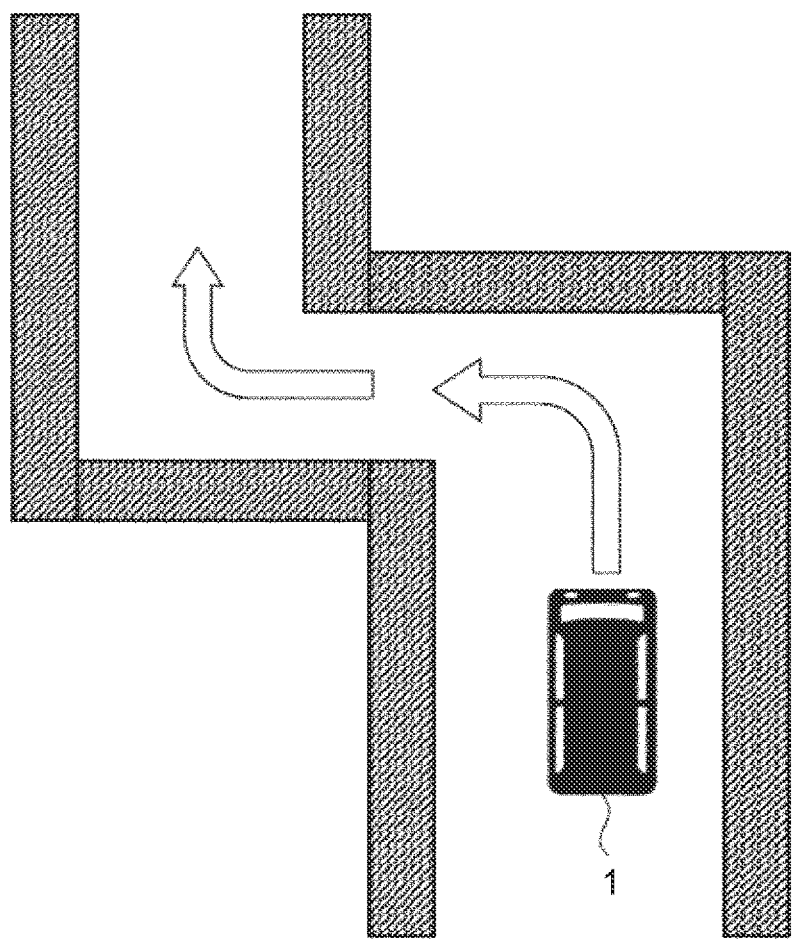
FIG. 8 is a conceptual diagram for describing another example of application of the rear wheel-only steering operation control according to the embodiments of the present disclosure.

FIG. 8 is a conceptual diagram for describing another example of application of the rear wheel-only steering operation control. In the example illustrated in FIG. 8, the vehicle 1 needs to enter a narrow road. Also in this situation, the rear wheel-only steering operation control (see FIG. 6) according to the embodiments is useful. By using the rear wheel-only steering operation control, the vehicle 1 can easily enter the narrow road without being steered many times.

The reverse-phase front-and-rear wheels steering operation control (see FIG. 5) with the small turning radius is useful, for example, for a U-turn.

Figure 9:
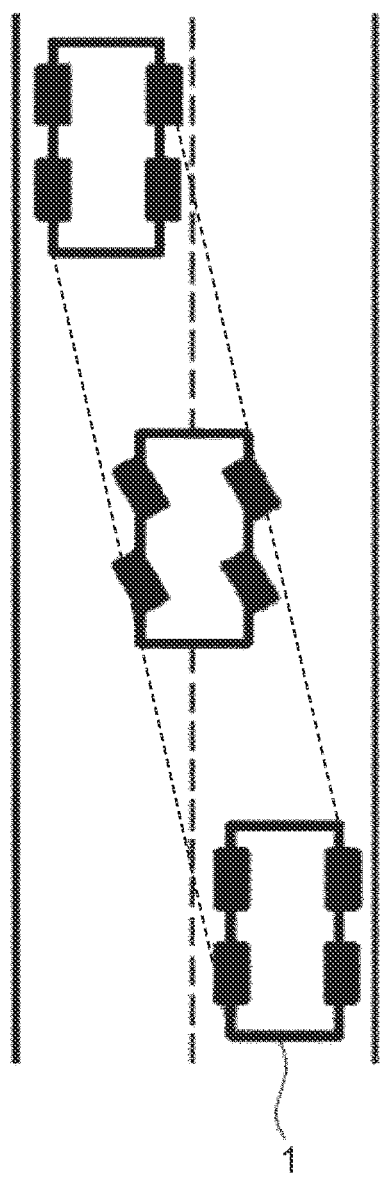
FIG. 9 is a conceptual diagram for describing an example of application of the front-and-rear wheels steering operation control (in-phase) according to the embodiments of the present disclosure.

FIG. 9 is a conceptual diagram for describing an example of application of the in-phase front-and-rear wheels steering operation control. In the case of in-phase front-and-rear wheels steering operation control, the yaw rate of the vehicle 1 is relatively low. The in-phase front-and-rear wheels steering operation control is useful, for example, in a scene of lane change or movement to a road shoulder. By using the in-phase front-and-rear wheels steering operation control, the vehicle 1 can change a lane or move to a road shoulder while securing the stability of the vehicle 1.

The front wheel-only steering operation control (see FIG. 4) is used for normal traveling. Thus, the vehicle 1 can travel along a turning path similar to that in a case of other general vehicles.

According to the embodiments described above, the plurality of types of steering operation control including at least the front wheel-only steering operation control and the rear wheel-only steering operation control is available in the vehicle 1 including the front wheels 2F and the rear wheels 2R. Among the plurality of types of steering operation control, steering operation control specified by the driving entity of the vehicle 1 is executed. That is, the driving entity can selectively use the plurality of types of steering operation control with flexibility depending on situations. Thus, a flexible steering operation can be executed depending on situations.

Various embodiments are described below in detail from the viewpoint of the driving entity of the vehicle 1.

2. First Embodiment

In a first embodiment, the driving entity of the vehicle 1 is a driver (human). The driver may be a driver actually riding the vehicle 1 or a remote operator remotely driving the vehicle 1. The steering instruction from the driving entity corresponds to a driver's steering operation on the steering wheel 3.

2-1. Configuration Example

Figure 10:
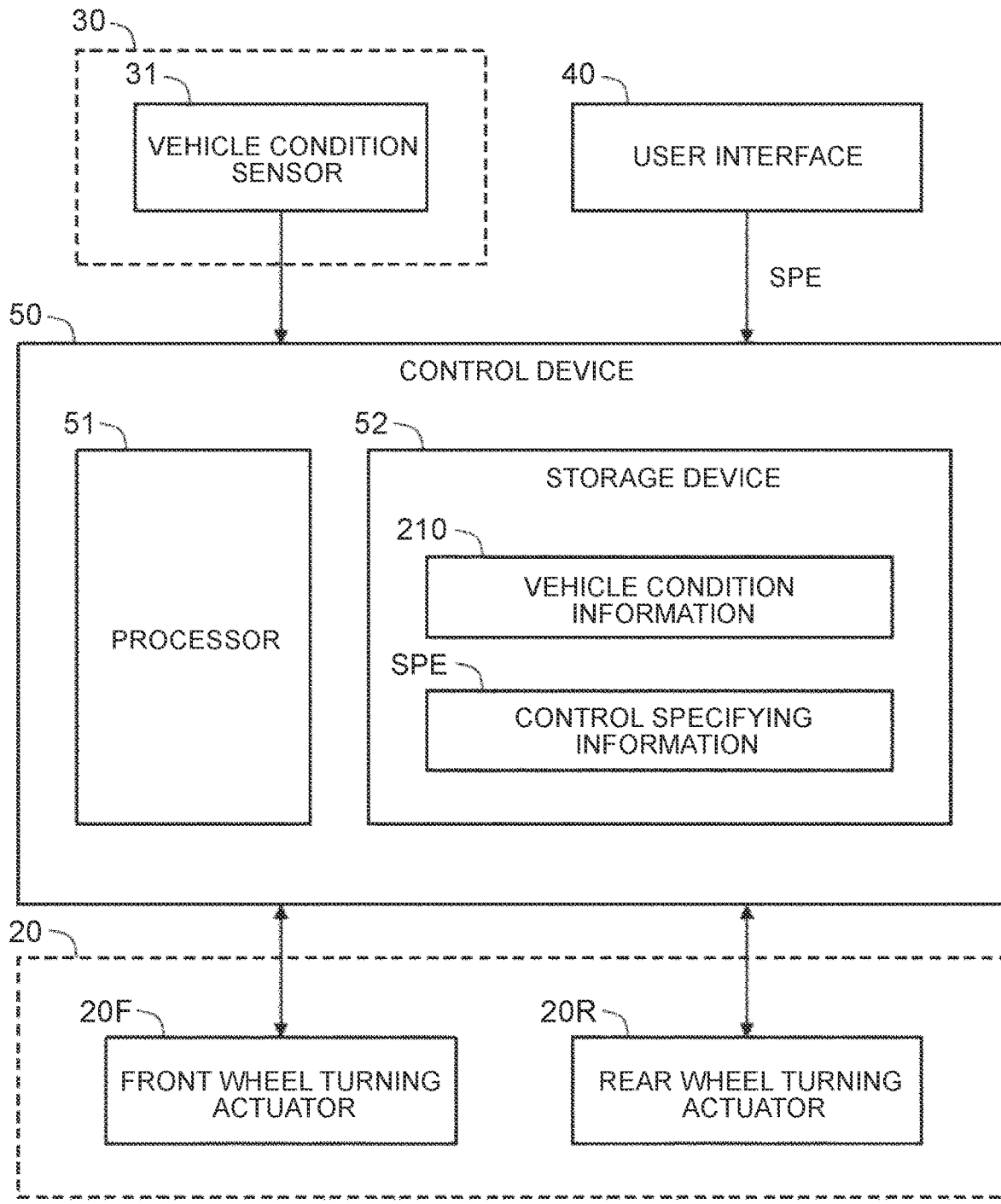
FIG. 10 is a block diagram illustrating an example of the configuration of a vehicle control system according to a first embodiment.

FIG. 10 is a block diagram illustrating an example of the configuration of a vehicle control system 10 according to the first embodiment. The vehicle control system 10 controls the vehicle 1. The vehicle control system 10 is typically mounted on the vehicle 1. Alternatively, at least a part of the vehicle control system 10 may be included in a remote driving system outside the vehicle 1, and may remotely control the vehicle 1. That is, the vehicle control system 10 may be distributed to the vehicle 1 and an external device.

The vehicle control system 10 includes a traveling device 20, the sensor unit 30, a user interface 40, and the control device 50.

The traveling device 20 is mounted on the vehicle 1. The traveling device 20 includes the front wheel turning actuator 20F and the rear wheel turning actuator 20R.

The front wheel turning actuator 20F is an electric actuator configured to turn the front wheels 2F. Examples of the front wheel turning actuator 20F include an electric motor. A rotor of the electric motor is connected to a steering operation shaft via a speed reducer. Both ends of the steering operation shaft are coupled to the right and left front wheels 2F. When the electric motor rotates, the rotational motion is converted into linear motion of the steering operation shaft to turn the front wheels 2F. The front wheels 2F and the front wheel turning actuator 20F are mechanically separated from the steering wheel 3. Operations of the front wheel turning actuator 20F are controlled by the control device 50 to turn the front wheels 2F.

The rear wheel turning actuator 20R is an electric actuator configured to turn the rear wheels 2R. Examples of the rear wheel turning actuator 20R include an electric motor. A rotor of the electric motor is connected to a steering operation shaft via a speed reducer. Both ends of the steering operation shaft are coupled to the right and left rear wheels 2R. When the electric motor rotates, the rotational motion is converted into linear motion of the steering operation shaft to turn the rear wheels 2R. The rear wheels 2R and the rear wheel turning actuator 20R are mechanically separated from the steering wheel 3. Operations of the rear wheel turning actuator 20R are controlled by the control device 50 to turn the rear wheels 2R.

The sensor unit 30 includes a vehicle condition sensor 31 configured to detect conditions of the vehicle 1. For example, the vehicle condition sensor 31 includes a steering angle sensor, a steering torque sensor, steered angle sensors, a vehicle speed sensor, a yaw rate sensor, and an acceleration sensor. The steering angle sensor detects a steering angle $\theta$ of the steering wheel 3 (steering wheel angle). The steering torque sensor detects a steering torque caused by an operation on the steering wheel 3. The steered angle sensors detect a steered angle $\delta f$ of the front wheels 2F and a steered angle $\delta r$ of the rear wheels 2R. For example, the steered angle sensors detect the steered angles $\delta f$ and $\delta r$ based on rotation angles of the electric motors. The vehicle speed sensor detects a vehicle speed V that is a speed of the vehicle 1. The yaw rate sensor detects a yaw rate of the vehicle 1. The acceleration sensor detects accelerations of the vehicle 1 (for example, a longitudinal acceleration and a lateral acceleration).

The user interface 40 is operated by the driver when the driver inputs control specifying information SPE. For example, the user interface 40 is mounted on the vehicle 1. As another example, when the driver is the remote operator, the user interface 40 is included in the remote driving system.

Figure 11:
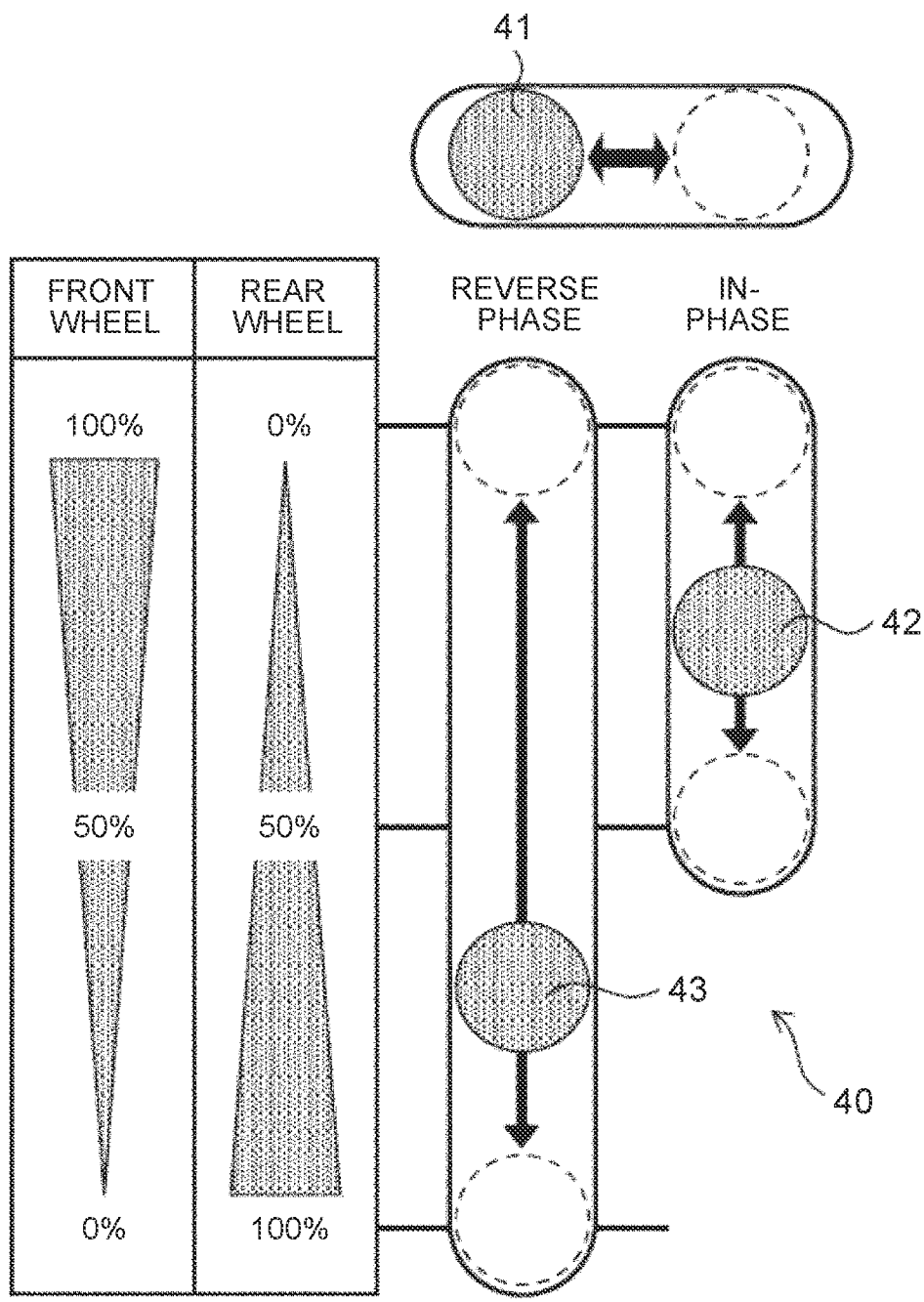
FIG. 11 is a conceptual diagram illustrating an example of the configuration of a user interface of the vehicle control system according to the first embodiment.

FIG. 11 is a conceptual diagram illustrating an example of the configuration of the user interface 40. In the example illustrated in FIG. 11, the user interface 40 includes a phase relationship specifying lever 41 and turning ratio specifying levers 42 and 43.

The phase relationship specifying lever 41 is used for specifying whether the phase relationship between the front wheels 2F and the rear wheels 2R is "in-phase" or "reverse phase". The driver can switch the phase relationship by operating the phase relationship specifying lever 41.

The turning ratio specifying lever 42 is used for specifying a ratio between a steered angle of the front wheels 2F and a steered angle of the rear wheels 2R in the case of in-phase. The turning ratio specifying lever 43 is used for specifying a ratio between a steered angle of the front wheels 2F and a steered angle of the rear wheels 2R in the case of reverse phase. The driver can change the steered angle ratio by operating the turning ratio specifying lever 42 or 43. The steered angle ratio may be changeable continuously or switchable stepwise. In the case of "in-phase", the steered angle ratio of the rear wheels 2R can be set within the range of 0% to 50%. In the case of "reverse phase", the steered angle ratio of the rear wheels 2R can be set within the range of 0% to 100%.

As another example, the user interface 40 may be a touch panel. The driver can input desired control specifying information SPE by operating the touch panel.

The control device 50 is a computer configured to control the vehicle 1. The control device 50 includes one or more processors 51 (hereinafter referred to simply as "processor 51") and one or more storage devices 52 (hereinafter referred to simply as "storage device 52"). The processor 51 executes various processes. For example, the processor 51 includes a central processing unit (CPU). The storage device 52 stores various types of information. Examples of the storage device 52 include a volatile memory, a non-volatile memory, a hard disk drive (HDD), and a solid state drive (SSD). The processor 51 (control device 50) implements various processes by the processor 51 executing a control program that is a computer program. The control program is stored in the storage device 52 or in a computer-readable recording medium. The control device 50 may include one or more electronic control units (ECUs). A part of the control device 50 may be an information processing device outside the vehicle 1. In this case, the part of the control device 50 communicates with the vehicle 1 and remotely controls the vehicle 1.

The control device 50 (processor 51) acquires vehicle condition information 210 from the vehicle condition sensor 31. The vehicle condition information 210 indicates detection results from the vehicle condition sensor 31, that is, conditions of the vehicle 1. Examples of the conditions of the vehicle 1 include a steering angle θ (steering wheel angle), a steering torque, a steered angle δf of the front wheels 2F, a steered angle δr of the rear wheels 2R, a vehicle speed V, a yaw rate, a longitudinal acceleration, and a lateral acceleration. The vehicle condition information 210 is stored in the storage device 52.

The control device 50 (processor 51) acquires, via the user interface 40, control specifying information SPE indicating specification by the driver. The control specifying information SPE is stored in the storage device 52.

The control device 50 (processor 51) executes the steering operation control for turning the wheels 2 based on the vehicle condition information 210 and the control specifying information SPE. The processor 51 can turn the front wheels 2F by controlling the front wheel turning actuator 20F. The processor 51 can turn the rear wheels 2R by controlling the rear wheel turning actuator 20R. The processor 51 can independently control the front wheel turning actuator 20F and the rear wheel turning actuator 20R. Thus, the processor 51 can achieve a plurality of types of steering operation control. Based on the control specifying information SPE, the processor 51 executes steering operation control specified by the control specifying information SPE among the plurality of types of steering operation control (specified control execution process).

The steering operation control (specified control execution process) according to the first embodiment is described below in more detail.

2-2. Steering Operation Control (Specified Control Execution Process)

Figure 12:
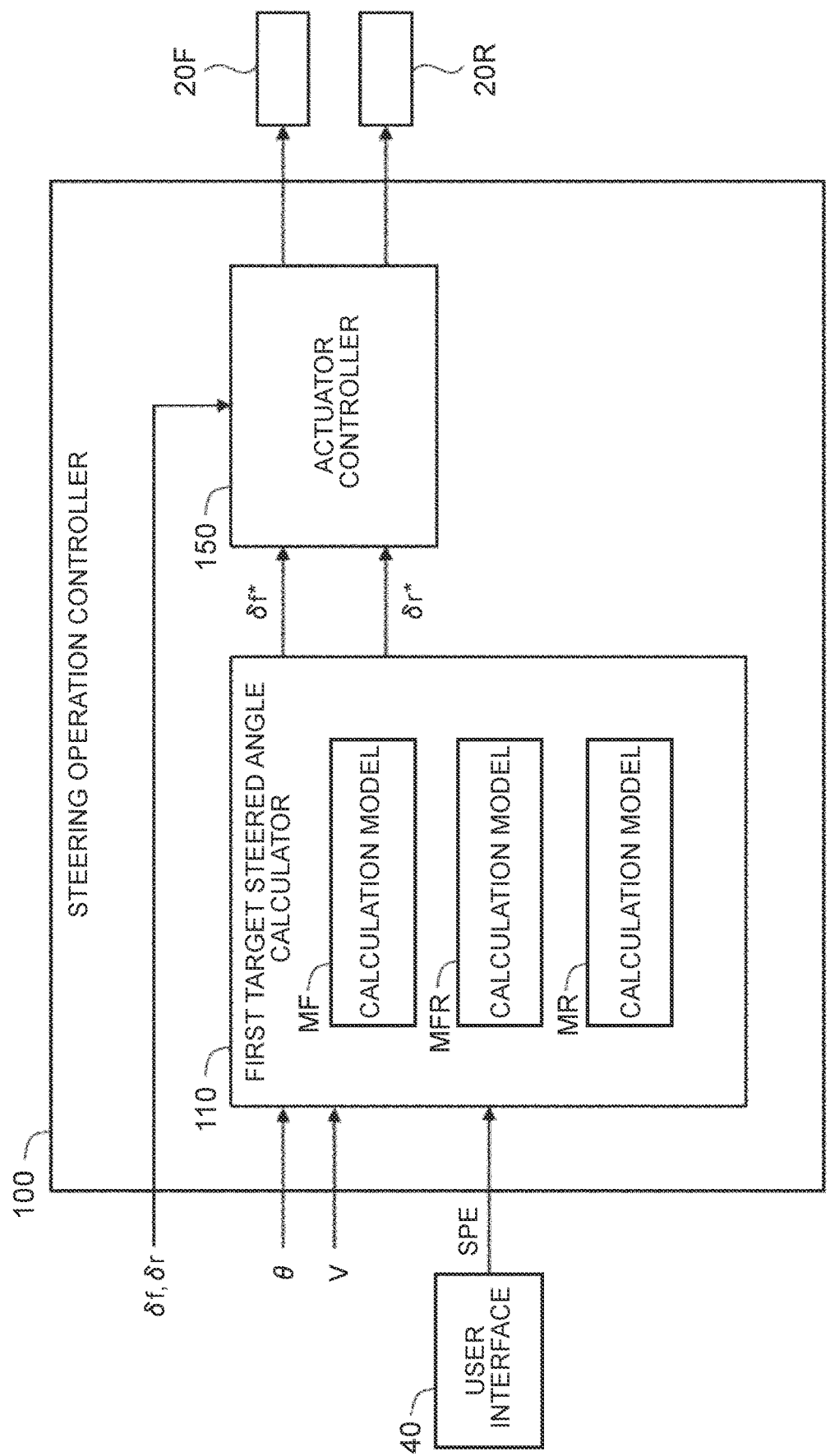
FIG. 12 is a block diagram illustrating a functional configuration related to steering operation control according to the first embodiment.

FIG. 12 is a block diagram illustrating a functional configuration related to the steering operation control according to the first embodiment. As described above, the control device 50 includes the steering operation controller 100 configured to execute the steering operation control. The steering operation controller 100 is implemented by the processor 51 executing the control program. The steering operation controller 100 includes a first target steered angle calculator 110 and an actuator controller 150.

The first target steered angle calculator 110 calculates target steered angles of the wheels 2. A target front wheel steered angle δf* is a target steered angle of the front wheels 2F. A target rear wheel steered angle δr* is a target steered angle of the rear wheels 2R. The target steered angle of each wheel 2 is expressed by a function of input parameters. The input parameters include a steering angle θ of the steering wheel 3. The steering angle θ reflects a driver's steering operation (steering instruction). The target steered angle basically increases as the steering angle θ increases. The input parameters may further include a vehicle speed V. The target steered angle basically decreases as the vehicle speed V increases.

The input parameters are acquired from the vehicle condition information 210. The first target steered angle calculator 110 calculates the target front wheel steered angle δf* and the target rear wheel steered angle δr* based on the input parameters. For example, the first target steered angle calculator 110 calculates target motion parameters of the vehicle 1 based on the input parameters. For example, the target motion parameters include a target yaw rate of the vehicle 1. The target motion parameters may include a target lateral acceleration of the vehicle 1. The first target steered angle calculator 110 calculates a target front wheel steered angle δf* and a target rear wheel steered angle δr* that are necessary to achieve the target motion parameters.

An equation of motion that governs motion of the vehicle 1 differs among the front wheel-only steering operation control, the front-and-rear wheels steering operation control, and the rear wheel-only steering operation control. In this embodiment, the first target steered angle calculator 110 calculates the target front wheel steered angle δf* and the target rear wheel steered angle δr* in consideration of the type of the steering operation control. More specifically, the first target steered angle calculator 110 acquires control specifying information SPE indicating specification by the driver. The first target steered angle calculator 110 calculates the target front wheel steered angle δf* and the target rear wheel steered angle δr* depending on steering operation control specified by the control specifying information SPE.

For example, "calculation models (functions)" for calculating the target front wheel steered angle δf* and the target rear wheel steered angle δr* from the input parameters may be prepared for the plurality of types of steering operation control. A calculation model MF is used for calculating the target front wheel steered angle δf* from the input parameters in the case of front wheel-only steering operation control. A calculation model MFR is used for calculating the target front wheel steered angle δf* and the target rear wheel steered angle δr* from the input parameters in the case of front-and-rear wheels steering operation control. A calculation model MR is used for calculating the target rear wheel steered angle δr* from the input parameters in the case of rear wheel-only steering operation control. Information on the calculation models MF, MFR, and MR is prestored in the storage device 52. The first target steered angle calculator 110 selects a calculation model corresponding to the steering operation control specified by the control specifying information SPE. The first target steered angle calculator 110 calculates the target front wheel steered angle δf* and the target rear wheel steered angle δr* in accordance with the input parameters by using the selected calculation model.

The control specifying information SPE may specify a ratio between the steered angle of the front wheels 2F (target steered angle) and the steered angle of the rear wheels 2R (target steered angle). In this case, the first target steered angle calculator 110 calculates the target front wheel steered angle δf* and the target rear wheel steered angle δr* based on the steered angle ratio specified by the control specifying information SPE. There is a possibility that the front-and-rear wheels steering operation control is specified but the steered angle ratio is not particularly specified. In this case, the first target steered angle calculator 110 may use a default steered angle ratio or automatically determine an appropriate steered angle ratio in consideration of the vehicle speed V or the like.

The control specifying information SPE may specify a phase relationship between the front wheels 2F and the rear wheels 2R (in-phase or reverse phase). In this case, the first target steered angle calculator 110 calculates the target front wheel steered angle δf* and the target rear wheel steered angle δr* in accordance with the phase relationship specified by the control specifying information SPE. There is a possibility that the front-and-rear wheels steering operation control is specified but the phase relationship is not particularly specified. In this case, the first target steered angle calculator 110 may use a default phase relationship or automatically determine an appropriate phase relationship in consideration of the vehicle speed V or the like.

The actuator controller 150 turns the front wheels 2F by controlling the front wheel turning actuator 20F based on the target front wheel steered angle δf*. For example, the actuator controller 150 executes feedback control so that an actual front wheel steered angle δf follows the target front wheel steered angle δf* based on a difference between the target front wheel steered angle δf* and the actual front wheel steered angle δf. The actual front wheel steered angle δf is acquired from the vehicle condition information 210. The actuator controller 150 outputs a current control signal for driving the front wheel turning actuator 20F. The front wheel turning actuator 20F is driven in accordance with the current control signal to turn the front wheels 2F.

Similarly, the actuator controller 150 turns the rear wheels 2R by controlling the rear wheel turning actuator 20R based on the target rear wheel steered angle δr*. For example, the actuator controller 150 executes feedback control so that an actual rear wheel steered angle δr follows the target rear wheel steered angle δr* based on a difference between the target rear wheel steered angle δr* and the actual rear wheel steered angle δr. The actual rear wheel steered angle δr is acquired from the vehicle condition information 210. The actuator controller 150 outputs a current control signal for driving the rear wheel turning actuator 20R. The rear wheel turning actuator 20R is driven in accordance with the current control signal to turn the rear wheels 2R.

2-3. Limitation on Reverse-Phase Steering Operation Control

For example, the rear wheel-only steering operation control is useful in a scene in which the vehicle 1 enters a narrow space (see FIG. 7 and FIG. 8). In such a scene, the vehicle 1 typically moves at a low speed. When the vehicle 1 is traveling at a medium or high speed, the rear wheel-only steering operation control may reduce the vehicle stability. Therefore, the processor 51 may prohibit the rear wheel-only steering operation control in a medium/high speed range.

For example, a first vehicle speed range VR1 is a low speed range in which the vehicle speed V is lower than a threshold Vth. A second vehicle speed range VR2 is a medium/high speed range in which the vehicle speed V is equal to or higher than the threshold Vth. The processor 51 permits the rear wheel-only steering operation control in the first vehicle speed range VR1, and prohibits the rear wheel-only steering operation control in the second vehicle speed range VR2.

From a similar viewpoint, a similar limitation may be imposed on the reverse-phase front-and-rear wheels steering operation control. The rear wheel-only steering operation control or the reverse-phase front-and-rear wheels steering operation control is hereinafter referred to as "reverse-phase steering operation control". The processor 51 may permit the reverse-phase steering operation control in the first vehicle speed range VR1, and prohibit the reverse-phase steering operation control in the second vehicle speed range VR2.

For example, when the driver specifies the reverse-phase steering operation control in the second vehicle speed range VR2, the processor 51 (steering operation controller 100) rejects control specifying information SPE that specifies the reverse-phase steering operation control. The processor 51 may notify the driver that the driver's specification is rejected. The processor 51 may notify the driver that the specification of the reverse-phase steering operation control is not currently acceptable.

As another example, the processor 51 may set the user interface 40 so that the driver cannot specify the reverse-phase steering operation control in the second vehicle speed range VR2. For example, in the second vehicle speed range VR2, the processor 51 fixes the phase relationship specifying lever 41 in FIG. 11 to an "in-phase" position. As another example, when the user interface 40 is a touch panel, the processor 51 controls display of the touch panel so that "reverse phase" cannot be selected in the second vehicle speed range VR2.

After the reverse-phase steering operation control is specified in the first vehicle speed range VR1, the vehicle speed V may gradually increase. In this case, the processor 51 (steering operation controller 100) may forcibly switch the steering operation control to be executed from the reverse-phase steering operation control to in-phase steering operation control at a timing when the vehicle speed V reaches "Vth−α". The "in-phase steering operation control" means the in-phase front-and-rear wheels steering operation control or the front wheel-only steering operation control. The processor 51 may notify the driver that the reverse-phase steering operation control is switched to the in-phase steering operation control.

Figure 13:
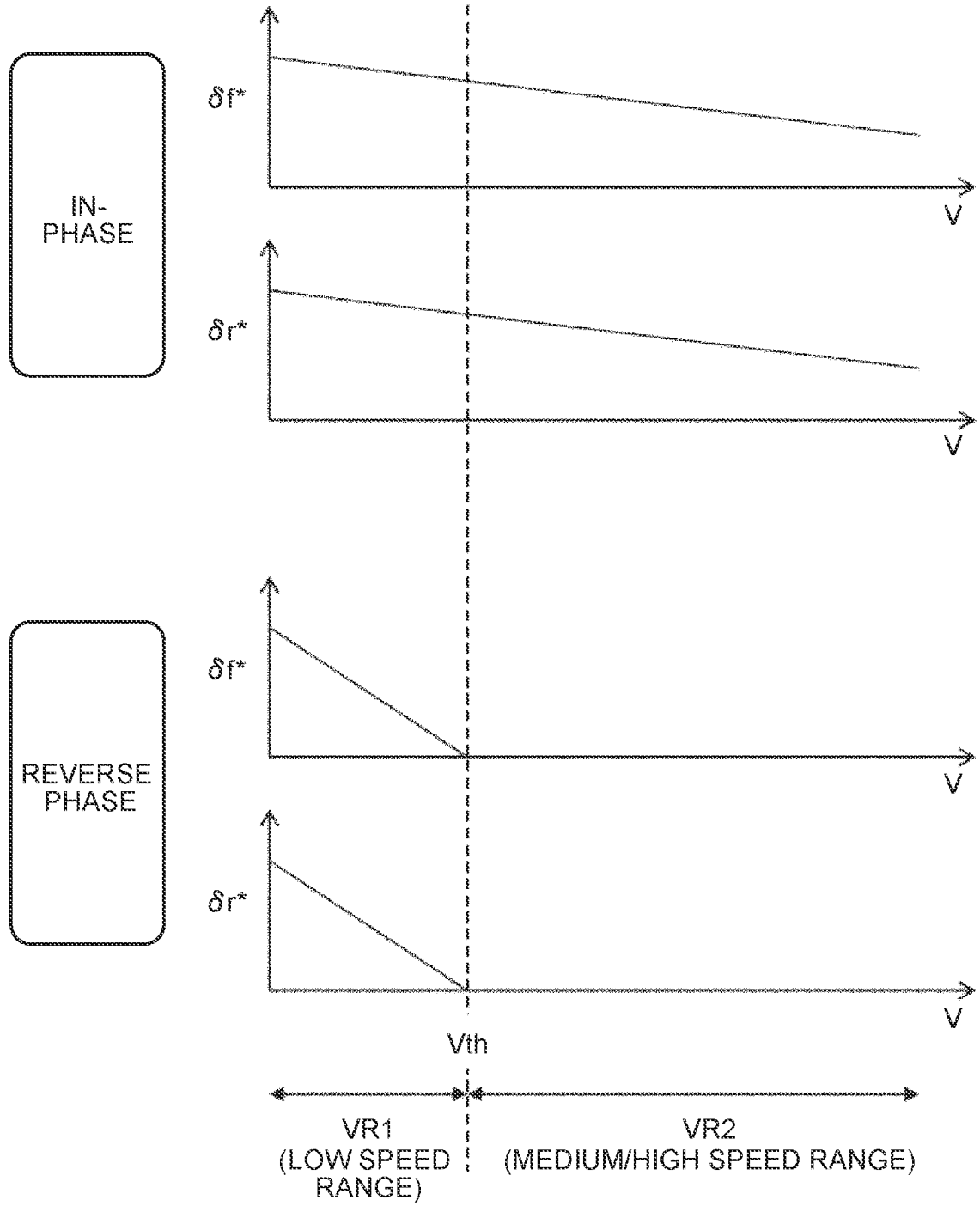
FIG. 13 is a conceptual diagram illustrating an example of relationships between a vehicle speed and target steered angles in the first embodiment.

FIG. 13 is a conceptual diagram illustrating an example of relationships between the vehicle speed V and the target steered angles (δf*, δr*). Each horizontal axis represents the vehicle speed V. Each vertical axis represents the target steered angle. It is assumed that input parameters other than the vehicle speed V (for example, the steering angle θ) are the same. In a case where each target steered angle is expressed by a product of a gain depending on the vehicle speed V and a fundamental target steered angle depending on the steering angle θ, each target steered angle in FIG. 13 can be regarded as the gain.

From the viewpoint of vehicle stability, the target steered angle (gain) decreases as the vehicle speed V increases. The rate of decrease in the target steered angle relative to the vehicle speed V differs between the in-phase steering operation control and the reverse-phase steering operation control. In the case of reverse-phase steering operation control, the target steered angle decreases earlier than the target steered angle in the case of in-phase steering operation control.

More specifically, in the case of in-phase steering operation control, the target steered angle gradually decreases along with an increase in the vehicle speed V over the first vehicle speed range VR1 and the second vehicle speed range VR2. The target steered angle in the case of reverse-phase steering operation control steeply decreases along with the increase in the vehicle speed V in the first vehicle speed range VR1. The target steered angle in the case of reverse-phase steering operation control is zero or infinitesimal when the vehicle speed V is equal to the threshold Vth. The target steered angle in the case of reverse-phase steering operation control is set to zero in the second vehicle speed range VR2. The processor 51 (steering operation controller 100) executes the steering operation control (specified control execution process) by setting the target steered angle as described above. Thus, the decrease in the vehicle stability is suppressed appropriately.

3. Second Embodiment

In a second embodiment, the vehicle 1 can perform autonomous driving. The driving entity of the vehicle 1 is an autonomous driving system configured to control the autonomous driving of the vehicle 1. The steering instruction from the driving entity is a steering request from the autonomous driving system.

3-1. Configuration Example

Figure 14:
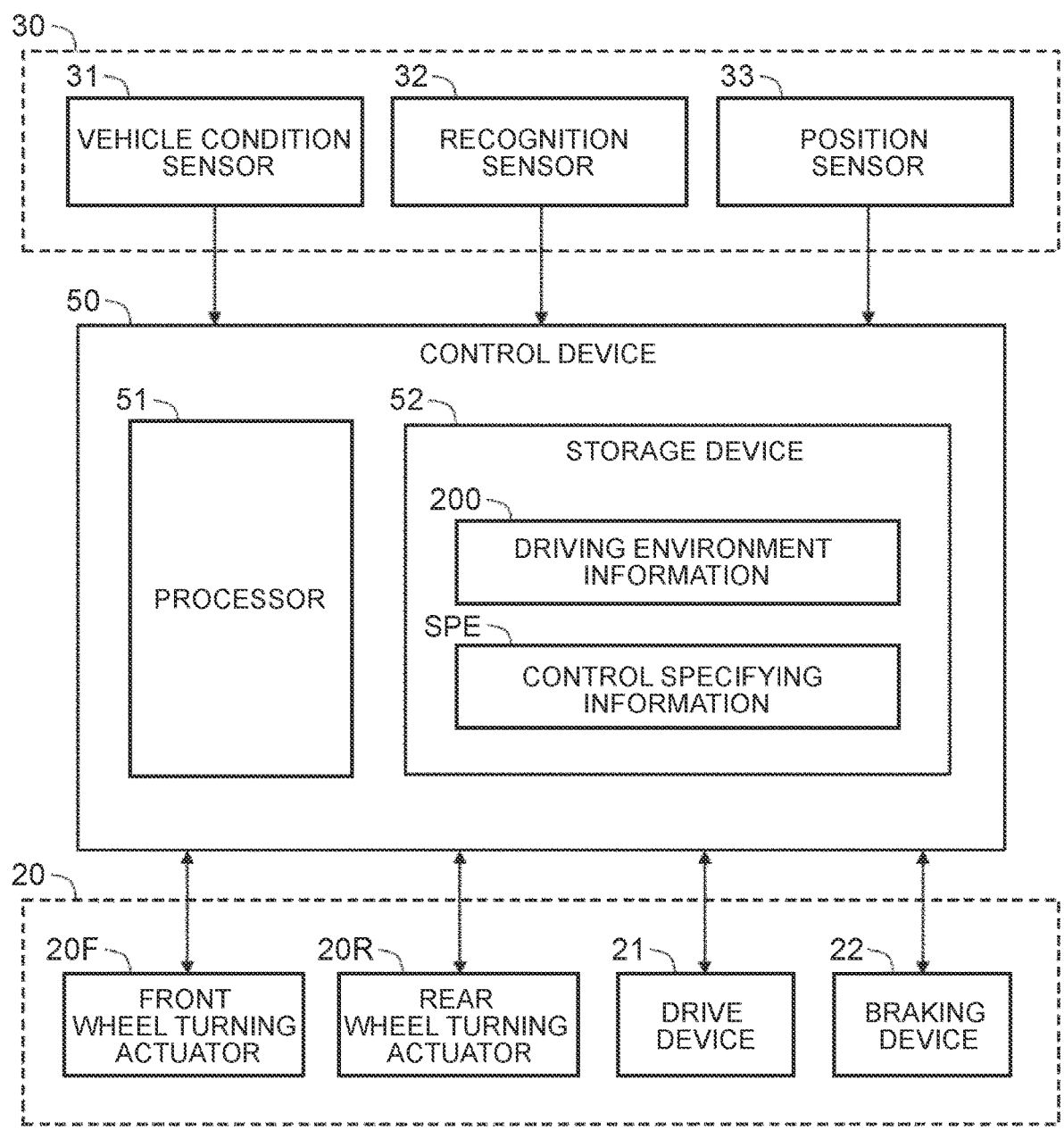
FIG. 14 is a block diagram illustrating an example of the configuration of a vehicle control system according to a second embodiment.

FIG. 14 is a block diagram illustrating an example of the configuration of a vehicle control system 10 according to the second embodiment. Description overlapping that in the first embodiment is omitted as appropriate.

The sensor unit 30 includes the vehicle condition sensor 31, a recognition sensor 32, and a position sensor 33. The vehicle condition sensor 31 is identical to that in the first embodiment.

The recognition sensor 32 recognizes (detects) situations around the vehicle 1. Examples of the recognition sensor 32 include a camera, a laser imaging, detection, and ranging (LIDAR) sensor, and a radar.

The position sensor 33 detects a position and an azimuth of the vehicle 1. Examples of the position sensor 33 include a Global Positioning System (GPS) sensor.

The traveling device 20 includes the front wheel turning actuator 20F, the rear wheel turning actuator 20R, a drive device 21, and a braking device 22. The front wheel turning actuator 20F and the rear wheel turning actuator 20R are identical to those in the first embodiment.

The drive device 21 is a power source configured to generate a driving force. Examples of the drive device 21 include an engine, an electric motor, and an in-wheel motor.

The braking device 22 generates a braking force.

3-2. Driving Environment Information

The processor 51 acquires driving environment information 200 indicating a driving environment of the vehicle 1. The driving environment information 200 is stored in the storage device 52.

Figure 15:
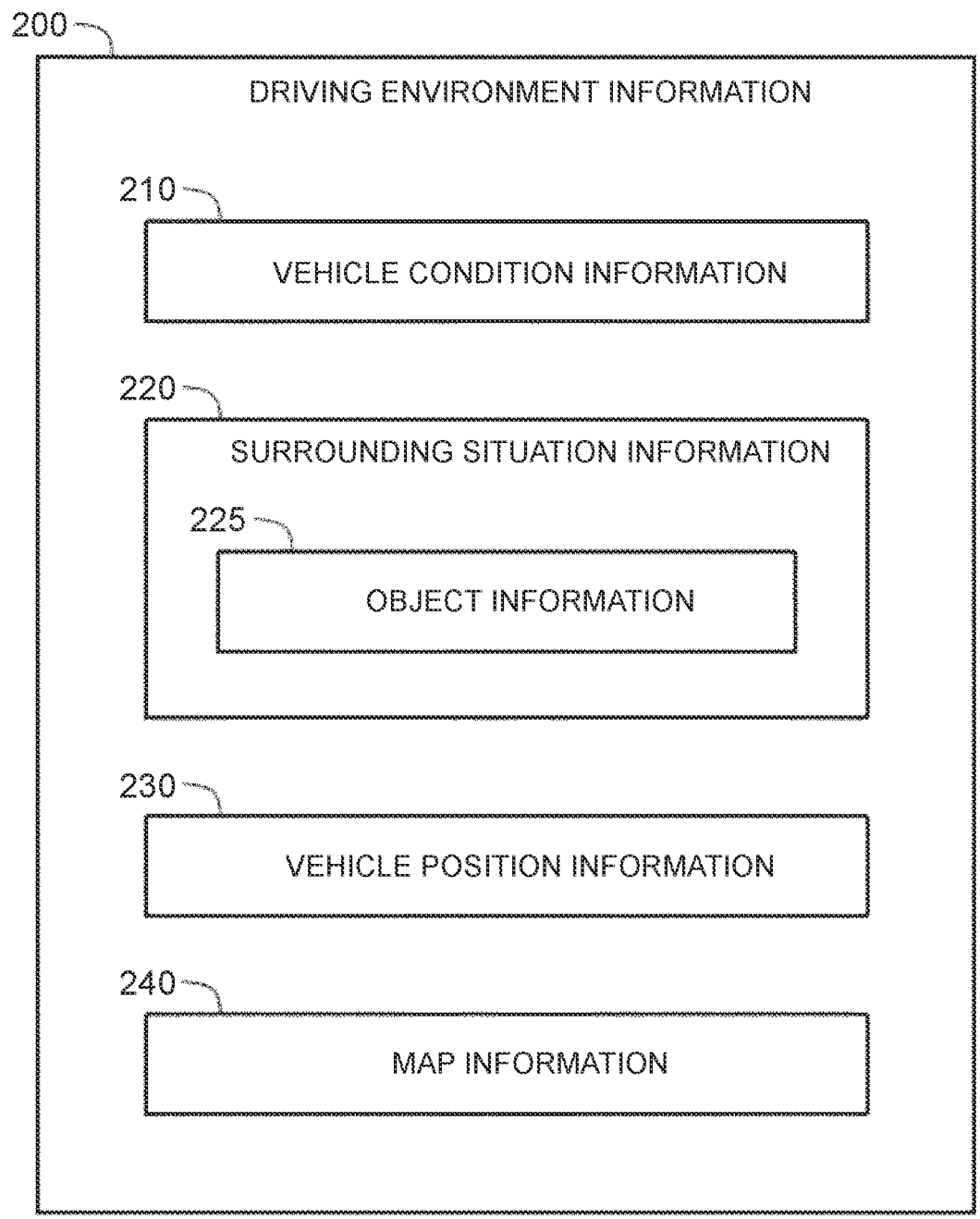
FIG. 15 is a block diagram illustrating an example of driving environment information in the second embodiment.

FIG. 15 is a block diagram illustrating an example of the driving environment information 200. The driving environment information 200 includes vehicle condition information 210, surrounding situation information 220, vehicle position information 230, and map information 240. The vehicle condition information 210 is identical to that in the first embodiment.

The surrounding situation information 220 indicates a situation around the vehicle 1. The surrounding situation information 220 includes information obtained by the recognition sensor 32. For example, the surrounding situation information 220 includes information on an image captured by the camera. As another example, the surrounding situation information 220 may include measurement information measured by the LIDAR sensor or the radar.

The surrounding situation information 220 includes object information 225 related to objects around the vehicle 1. Examples of the objects around the vehicle 1 include a person (for example, a pedestrian), other vehicles (for example, a preceding vehicle or a parked vehicle), lane marking lines, roadside structures, and obstacles. The object information 225 indicates a relative position and a relative speed of each object to the vehicle 1. For example, an object can be identified and a relative position of the object can be calculated by analyzing image information obtained by the camera. An object may be identified and a relative position and a relative speed of the object can be calculated based on measurement information from the LIDAR sensor or the radar.

The vehicle position information 230 indicates a position and an azimuth of the vehicle 1. The processor 51 acquires the vehicle position information 230 based on detection results from the position sensor 33. The processor 51 may acquire the vehicle position information 230 with high accuracy through a known self-position estimation process (localization).

The map information 240 indicates lane arrangement, road shapes, and the like. The processor 51 acquires map information 240 in a required area from a map database. The map database may be stored in a predetermined storage device mounted on the vehicle 1 or in an external management server. When the map database is stored in the external management server, the processor 51 communicates with the management server and acquires necessary map information 240.

3-3. Vehicle Traveling Control and Autonomous Driving Control

The processor 51 executes "vehicle traveling control" for controlling traveling of the vehicle 1. The vehicle traveling control includes steering operation control, acceleration control, and deceleration control. The processor 51 executes the vehicle traveling control by controlling the traveling device 20. Specifically, the processor 51 executes the steering operation control by controlling the front wheel turning actuator 20F and the rear wheel turning actuator 20R. The processor 51 executes the acceleration control by controlling the drive device 21. The processor 51 executes the deceleration control by controlling the braking device 22.

The processor 51 executes "autonomous driving control" for controlling the autonomous driving of the vehicle 1 based on the above driving environment information 200. Specifically, the processor 51 generates a traveling plan of the vehicle 1 based on the driving environment information 200. The traveling plan includes a rough target route to a destination and a target operation. Examples of the target operation include operations of keeping a currently traveling lane, changing a lane, and avoiding an obstacle. The processor 51 generates, based on the driving environment information 200, a target trajectory (target path) necessary for the vehicle 1 to travel in accordance with the traveling plan. The target trajectory includes a target position and a target speed. The processor 51 executes the vehicle traveling control so that the vehicle 1 follows the target trajectory.

The steering operation control (specified control execution process) according to the second embodiment is described below in more detail.

3-4. Steering Operation Control (Specified Control Execution Process)

Figure 16:
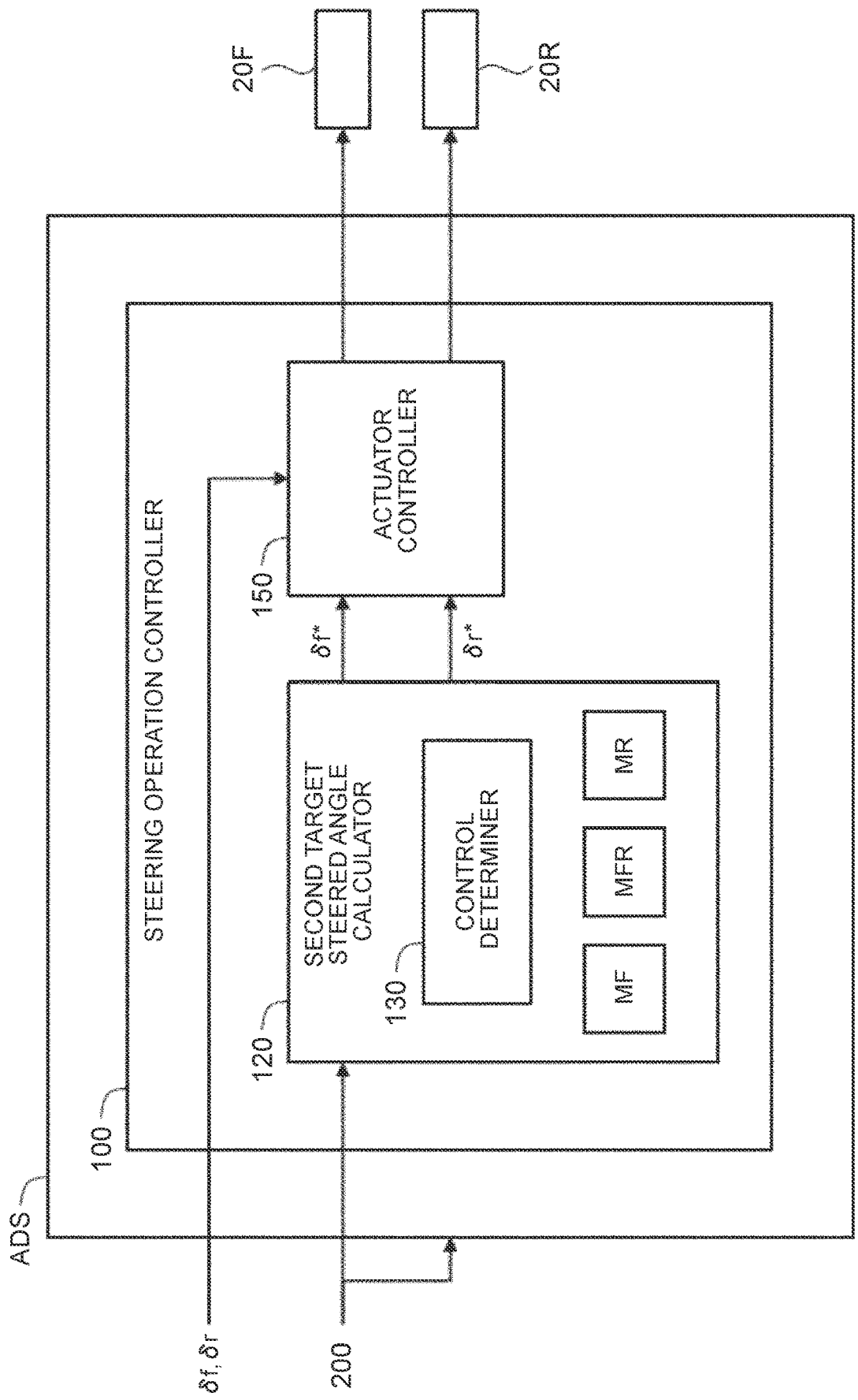
FIG. 16 is a block diagram illustrating a functional configuration related to steering operation control according to the second embodiment.

FIG. 16 is a block diagram illustrating a functional configuration related to the steering operation control according to the second embodiment. Description overlapping that in the first embodiment is omitted as appropriate.

An autonomous driving system ADS executes the autonomous driving control based on driving environment information 200. The autonomous driving system ADS is implemented such that the processor 51 executes the control program. The autonomous driving system ADS generates a traveling plan and a target trajectory of the vehicle 1 based on the driving environment information 200.

The steering operation controller 100 configured to execute the steering operation control is included in the autonomous driving system ADS. The steering operation controller 100 includes a second target steered angle calculator 120 and the actuator controller 150.

The second target steered angle calculator 120 calculates target steered angles of the wheels 2 ($\delta f^*$, $\delta r^*$). More specifically, the second target steered angle calculator 120 calculates the target steered angles based on the target trajectory generated by the autonomous driving system ADS. For example, the second target steered angle calculator 120 calculates deviations between the vehicle 1 and the target trajectory. The deviations include a lateral deviation and a yaw angle deviation. The second target steered angle calculator 120 calculates target motion parameters necessary to reduce the deviations. The target motion parameters include a target yaw rate and a target lateral acceleration. The second target steered angle calculator 120 calculates a target front wheel steered angle $\delta f^*$ and a target rear wheel steered angle $\delta r^*$ necessary to achieve the target motion parameters.

As described above, the equation of motion that governs the motion of the vehicle 1 differs among the front wheel-only steering operation control, the front-and-rear wheels steering operation control, and the rear wheel-only steering operation control. Similarly to the first embodiment, the second target steered angle calculator 120 calculates the target front wheel steered angle $\delta f^*$ and the target rear wheel steered angle $\delta r^*$ in consideration of the type of the steering operation control. More specifically, the second target steered angle calculator 120 acquires control specifying information SPE, and calculates the target front wheel steered angle $\delta f^*$ and the target rear wheel steered angle $\delta r^*$ depending on steering operation control specified by the control specifying information SPE. In the second embodiment, the autonomous driving system ADS automatically determines the control specifying information SPE.

More specifically, the autonomous driving system ADS includes a control determiner 130 configured to determine the control specifying information SPE. The control determiner 130 may be included in the second target steered angle calculator 120. The control determiner 130 automatically determines the control specifying information SPE based on the driving environment information 200.

Figure 17:
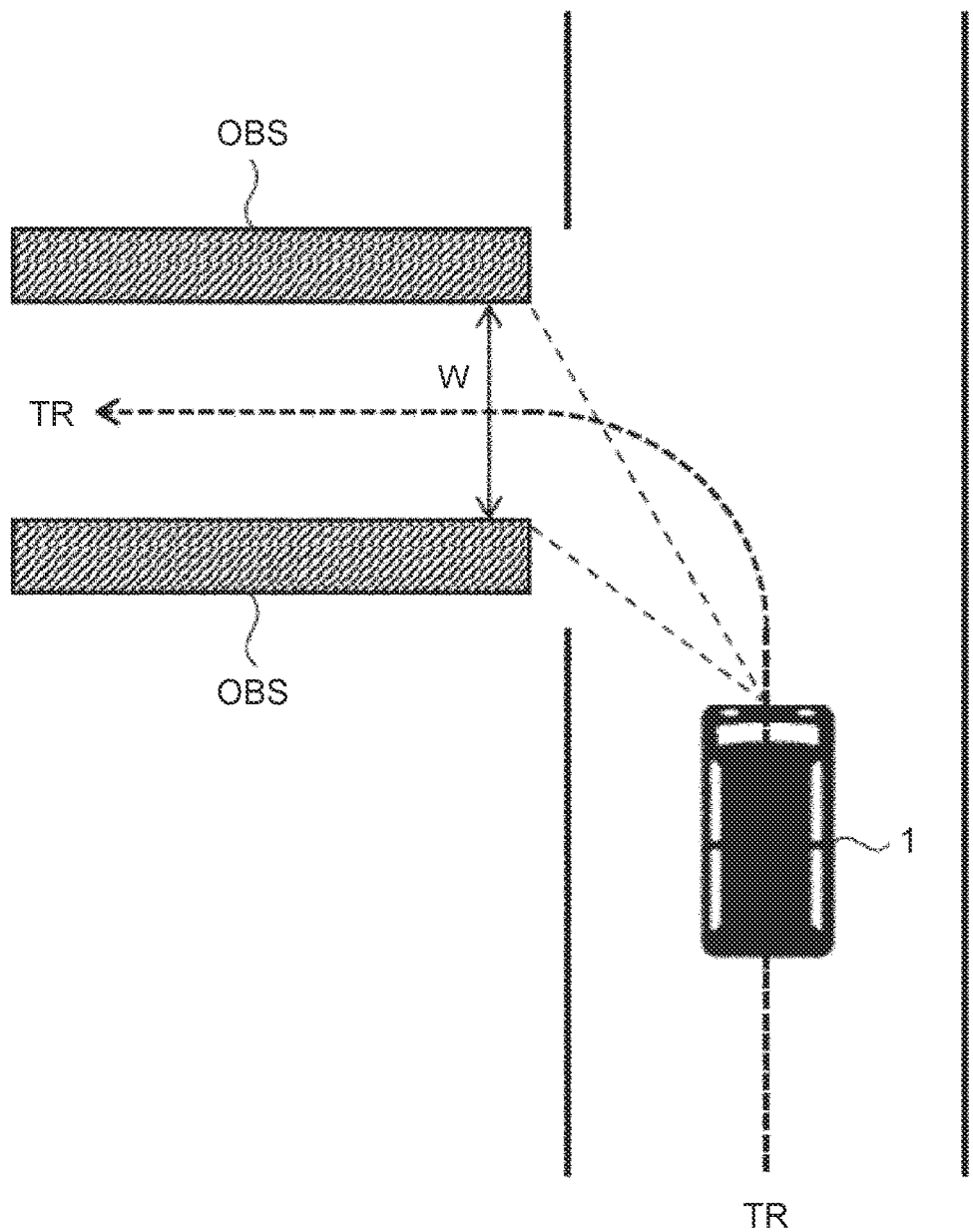
FIG. 17 is a conceptual diagram for describing the steering operation control according to the second embodiment.

FIG. 17 is a conceptual diagram for describing an example of a method for determining the control specifying information SPE. The traveling plan determined by the autonomous driving system ADS includes a rough target route TR to a destination. The control determiner 130 grasps obstacles OBS around the target route TR and relative positions of the obstacles OBS based on the object information 225 (see FIG. 15) included in the driving environment information 200. Examples of the obstacle OBS include a wall and a parked vehicle. The control determiner 130 may calculate a road width W between the obstacles OBS, that is, a travelable road width W based on the relative positions of the obstacles OBS.

Vehicle size information indicating, for example, the width, length, wheelbase, and overhang of the vehicle 1 is generated in advance and stored in the storage device 52. Based on the vehicle size information and the relative positions of the obstacles OBS or the road width W, the control determiner 130 determines control specifying information SPE that can achieve traveling of the vehicle causing no contact with the obstacles OBS.

For example, the control determiner 130 simulates vehicle body trajectories (see FIG. 4 to FIG. 6) in various patterns of control specifying information SPE by using the calculation models MF, MFR, and MR. In this simulation, the vehicle size information and the vehicle condition information 210 are used as appropriate. The control determiner 130 selects control specifying information SPE that achieves a vehicle body trajectory causing no contact with the obstacles OBS. For example, the control determiner 130 selects control specifying information SPE that achieves a vehicle body trajectory spaced away from the obstacles OBS by a predetermined margin or more.

As another example, a learning model may be used for outputting appropriate control specifying information SPE depending on situations. Examples of information to be input to the learning model include the relative positions of the obstacles OBS, the road width W, and the vehicle size information. The learning model is trained in advance based on training data including a large number of combinations of input information and appropriate control specifying information SPE. The learning model is stored in the storage device 52. By using the learning model, the control determiner 130 acquires appropriate control specifying information SPE based on current input information.

The control determiner 130 may determine the control specifying information SPE based on the traveling plan determined by the autonomous driving system ADS. For example, when the traveling plan is lane change, the in-phase front-and-rear wheels steering operation control may be selected (see FIG. 9).

The control determiner 130 may determine the control specifying information SPE from the viewpoint of occupant's riding comfort in the vehicle 1.

In the manner described above, the control determiner 130 automatically determines the control specifying information SPE. The second target steered angle calculator 120 calculates a target front wheel steered angle $\delta f^*$ and a target rear wheel steered angle $\delta r^*$ depending on the steering operation control specified by the control specifying information SPE. The actuator controller 150 is similar to that in the first embodiment.

3-5. Limitation on Reverse-Phase Steering Operation Control

The limitation on the reverse-phase steering operation control is similar to that in the first embodiment (see Section 2-3). For example, the processor 51 permits the reverse-phase steering operation control in the first vehicle speed range VR1, and prohibits the reverse-phase steering operation control in the second vehicle speed range VR2. Relationships between the vehicle speed V and the target steered angles (δf*, δr*) are as illustrated in FIG. 13.

4. Third Embodiment

A third embodiment is directed to a vehicle 1 that can switch manual driving and autonomous driving. Description overlapping that in the first and second embodiments is omitted as appropriate.

FIG. 18 is a block diagram illustrating a functional configuration related to steering operation control according to the third embodiment. The steering operation controller 100 includes the first target steered angle calculator 110, the second target steered angle calculator 120, a selector 140, and the actuator controller 150. A selection signal SEL indicates whether a current driving mode is a manual driving mode or an autonomous driving mode.

When the selection signal SEL indicates the manual driving mode, the first target steered angle calculator 110 operates. The selector 140 selects a target front wheel steered angle δf* and a target rear wheel steered angle δr* calculated by the first target steered angle calculator 110, and outputs the selected target steered angles to the actuator controller 150. Thus, the steering operation control is executed similarly to that in the first embodiment.

When the selection signal SEL indicates the autonomous driving mode, the second target steered angle calculator 120 operates. The selector 140 selects a target front wheel steered angle δf* and a target rear wheel steered angle δr* calculated by the second target steered angle calculator 120, and outputs the selected target steered angles to the actuator controller 150. Thus, the steering operation control is executed similarly to that in the second embodiment.

What is claimed is:

1. A vehicle control method for controlling a vehicle including a front wheel and a rear wheel, the vehicle control method comprising:
    executing front wheel steering operation control for turning the front wheel without turning the rear wheel in response to a steering instruction from a driving entity;
    executing rear wheel steering operation control for turning the rear wheel without turning the front wheel in response to the steering instruction from the driving entity;
    executing front-and-rear wheels steering operation control for turning both the front wheel and the rear wheel in response to the steering instruction from the driving entity; and
    executing a specified control execution process for executing one of steering operation control specified by the driving entity among a plurality of steering operation control including at least the front wheel steering operation control, the rear wheel steering operation control, and the front-and-rear wheels steering operation control, wherein
    a target steered angle of the front wheel and a target steered angle of the rear wheel depend on a vehicle speed of the vehicle,
    a first vehicle speed range is a range in which the vehicle speed is lower than a threshold,
    a second vehicle speed range is a range in which the vehicle speed is equal to or higher than the threshold, and
    the specified control execution process includes
        setting the target steered angles such that the target steered angles decrease along with an increase in the vehicle speed over the first vehicle speed range and the second vehicle speed range, when the driving entity specifies in-phase as a phase relationship between the front wheel and the rear wheel, the in-phase being a phase relationship which a turning direction of the front wheel is identical to a turning direction of the rear wheel and
        setting the target steered angles such that the target steered angles decrease along with the increase in the vehicle speed in the first vehicle speed range and reach zero in the second vehicle speed range, when the driving entity specifies counter phase as the phase relationship between the front wheel and the rear wheel, the counter phase being a phase relationship which the turning direction of the front wheel is opposite to the turning direction of the rear wheel.

2. The vehicle control method according to claim 1, further comprising prohibiting the rear wheel steering operation control when the vehicle speed of the vehicle is equal to or higher than the threshold.

3. The vehicle control method according to claim 1, wherein
    the specified control execution process includes setting the target steered angle, when the driving entity specifies the rear wheel steering operation control, such that the target steered angle decreases along with an increase in the vehicle speed in the first vehicle speed range and reaches zero in the second vehicle speed range.

4. The vehicle control method according to claim 1, wherein the specified control execution process includes executing, when the driving entity specifies a ratio between a steered angle of the front wheel and a steered angle of the rear wheel, the front-and-rear wheels steering operation control based on the ratio specified by the driving entity.

5. The vehicle control method according to claim 1, wherein the specified control execution process includes executing, when the driving entity specifies whether the phase relationship between the front wheel and the rear wheel is the in-phase or the counter phase, the front-and-rear wheels steering operation control based on the phase relationship specified by the driving entity.

6. The vehicle control method according to claim 1, wherein the specified control execution process includes:
    a process for acquiring control specifying information indicating specification by the driving entity; and
    a process for executing the specified control execution process based on the control specifying information.

7. The vehicle control method according to claim 6, wherein:
    the driving entity is a driver of the vehicle;
    the steering instruction is a steering operation performed on a steering wheel by the driver; and
    the process for acquiring the control specifying information includes a process for receiving the control specifying information input by the driver via a user interface.

8. The vehicle control method according to claim 6, wherein:

the driving entity is an autonomous driving system configured to control autonomous driving of the vehicle based on driving environment information indicating a driving environment of the vehicle;
the steering instruction is a steering request from the autonomous driving system; and
the process for acquiring the control specifying information includes a process for determining the control specifying information based on the driving environment information.

9. A vehicle control system configured to control a vehicle including a front wheel and a rear wheel, the vehicle control system comprising one or more processors configured to execute:
front wheel steering operation control for turning the front wheel without turning the rear wheel in response to a steering instruction from a driving entity;
rear wheel steering operation control for turning the rear wheel without turning the front wheel in response to the steering instruction from the driving entity;
front-and-rear wheels steering operation control for turning both the front wheel and the rear wheel in response to the steering instruction from the driving entity; and
a specified control execution process for executing one of control specified by the driving entity among a plurality of control including at least the front wheel steering operation control, the rear wheel steering operation control, and the front-and-rear wheels steering operation control, wherein
a target steered angle of the front wheel and a target steered angle of the rear wheel depend on a vehicle speed of the vehicle,
a first vehicle speed range is a range in which the vehicle speed is lower than a threshold,
a second vehicle speed range is a range in which the vehicle speed is equal to or higher than the threshold, and
the specified control execution process includes
setting the target steered angles such that the target steered angles decrease along with an increase in the vehicle speed over the first vehicle speed range and the second vehicle speed range, when the driving entity specifies in-phase as a phase relationship between the front wheel and the rear wheel, the in-phase being a phase relationship which a turning direction of the front wheel is identical to a turning direction of the rear wheel and
setting the target steered angles such that the target steered angles decrease along with the increase in the vehicle speed in the first vehicle speed range and reach zero in the second vehicle speed range, when the driving entity specifies counter phase as the phase relationship between the front wheel and the rear wheel, the counter phase being a phase relationship which the turning direction of the front wheel is opposite to the turning direction of the rear wheel.

10. The vehicle control system according to claim 9, further comprising a user interface to be operated by a driver of the vehicle, wherein:
the driving entity is the driver;
the steering instruction is a steering operation performed on a steering wheel by the driver; and
the one or more processors are configured to acquire, via the user interface, control specifying information indicating specification by the driver, and execute the specified control execution process based on the control specifying information.

11. A vehicle comprising:
a front wheel turning actuator mechanically separated from a steering wheel and configured to turn a front wheel;
a rear wheel turning actuator mechanically separated from the steering wheel and configured to turn a rear wheel; and
one or more processors configured to,
turn the front wheel by controlling the front wheel turning actuator,
turn the rear wheel by controlling the rear wheel turning actuator,
execute front wheel steering operation control for turning the front wheel without turning the rear wheel in response to a steering instruction from a driving entity;
execute rear wheel steering operation control for turning the rear wheel without turning the front wheel in response to the steering instruction from the driving entity;
execute front-and-rear wheels steering operation control for turning both the front wheel and the rear wheel in response to the steering instruction from the driving entity; and
execute a specified control execution process for executing one of control specified by the driving entity among a plurality of control including at least the front wheel steering operation control, the rear wheel steering operation control, and the front-and-rear wheels steering operation control, wherein
a target steered angle of the front wheel and a target steered angle of the rear wheel depend on a vehicle speed of the vehicle,
a first vehicle speed range is a range in which the vehicle speed is lower than a threshold,
a second vehicle speed range is a range in which the vehicle speed is equal to or higher than the threshold, and
the specified control execution process includes
setting the target steered angles such that the target steered angles decrease along with an increase in the vehicle speed over the first vehicle speed range and the second vehicle speed range, when the driving entity specifies in-phase as a phase relationship between the front wheel and the rear wheel, the in-phase being a phase relationship which a turning direction of the front wheel is identical to a turning direction of the rear wheel, and
setting the target steered angles such that the target steered angles decrease along with the increase in the vehicle speed in the first vehicle speed range and reach zero in the second vehicle speed range, when the driving entity specifies counter phase as the phase relationship between the front wheel and the rear wheel, the counter phase being a phase relationship which the turning direction of the front wheel is opposite to the turning direction of the rear wheel.

12. The vehicle control method according to claim 1, wherein the specified control execution process includes, when the driving entity specifies the counter phase as the phase relationship between the front wheel and the rear wheel, setting the target steered angles such that the target steered angles decrease earlier, as the vehicle speed increases, than the target steered angles when the driving entity specifies the in-phase as the phase relationship between the front wheel and the rear wheel.

* * * * *